US009847994B1

(12) United States Patent
Kelly et al.

(10) Patent No.: US 9,847,994 B1
(45) Date of Patent: Dec. 19, 2017

(54) SYSTEM AND METHOD FOR PROVIDING A SECURE NETWORK

(71) Applicant: SurfDash, Las Vegas, NV (US)

(72) Inventors: Jennifer Kelly, Santa Cruz, CA (US); Robert Carr, Santa Cruz, CA (US); Raymond Kelly, Santa Cruz, CA (US); Seyed Safakish, Santa Cruz, CA (US)

(73) Assignee: SURFDASH, Las Vegas, NV (US)

( * ) Notice: Subject to any disclaimer, the term of this patent is extended or adjusted under 35 U.S.C. 154(b) by 245 days.

(21) Appl. No.: 14/871,920

(22) Filed: Sep. 30, 2015

(51) Int. Cl.
H04L 29/06 (2006.01)
G06F 21/62 (2013.01)
H04L 29/08 (2006.01)

(52) U.S. Cl.
CPC ............ *H04L 63/083* (2013.01); *G06F 21/62* (2013.01); *H04L 67/02* (2013.01); *H04L 67/06* (2013.01)

(58) Field of Classification Search
CPC ........... G06Q 30/0251; G06Q 30/0269; G06Q 50/01; G06Q 50/184; G06Q 10/101; H04L 51/046; H04L 51/14; H04L 51/32; H04L 67/104; H04L 67/22; H04L 67/24; H04L 67/306; H04L 67/02; H04L 65/403; G06F 17/30867
USPC ............................................... 726/9
See application file for complete search history.

(56) References Cited

U.S. PATENT DOCUMENTS

| | | | |
|---|---|---|---|
| 2013/0018960 A1* | 1/2013 | Knysz | G06Q 50/01 709/204 |
| 2014/0067702 A1* | 3/2014 | Rathod | G06Q 10/10 705/319 |
| 2016/0006743 A1* | 1/2016 | Liu | H04L 9/32 726/4 |

* cited by examiner

Primary Examiner — Brian F Shaw
(74) Attorney, Agent, or Firm — Steptoe & Johnson LLP

(57) ABSTRACT

A method and system for providing a secure network. The system can have a URL programming interface, a server, and a database connected to the server. The server can be configured to receive requests from the URL programming interface. The server can include a file manager, an authentication server, a resource server, and a collaboration server.

25 Claims, 14 Drawing Sheets

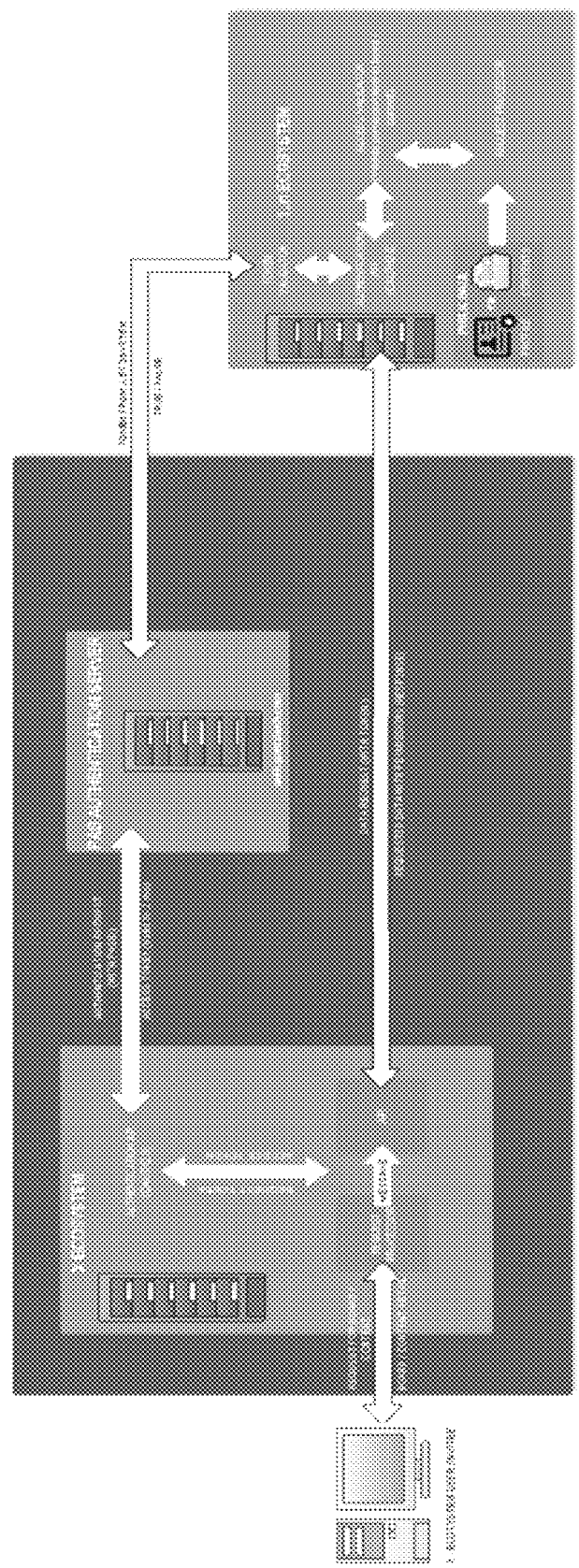

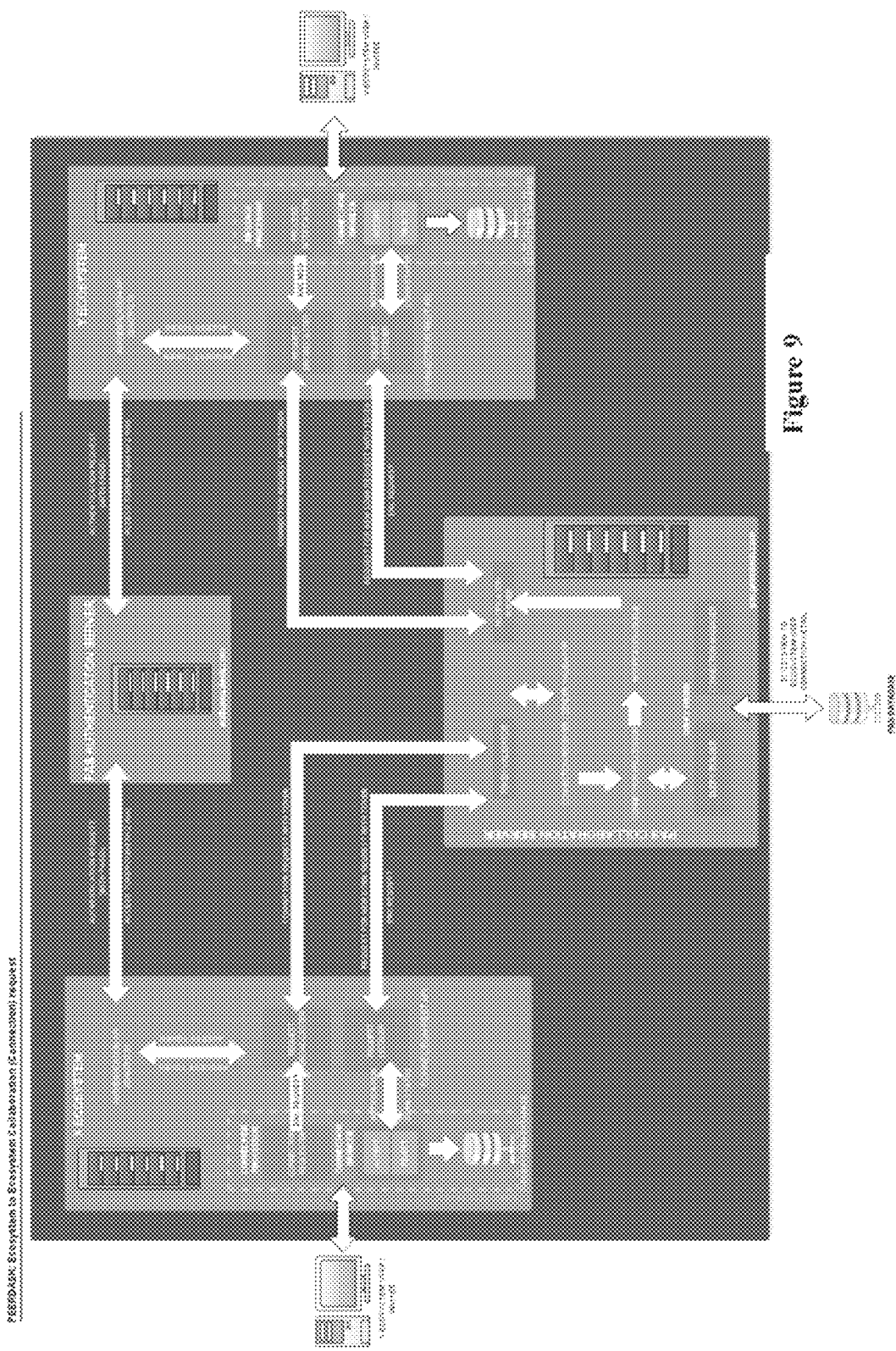

| | | | | |
|---|---|---|---|---|
| EMAILING CONTENT | | | | |
| Email Web Content (not uploaded) | ◉ | ◉ | ◉ | ◉ |
| Email Uploaded Content | ◉ | ◉ | ◉ | ◉ |
| EMAILING BOARDS | | | | |
| Email Private Board | ◉ | n/a | n/a | n/a |
| Email Collaborative Board | ◉ | ◉ | n/a | n/a |
| Email Ecosystem Board | ◉ | n/a | ◉ | n/a |
| Email Public Board | ◉ | n/a | ◉ | ◉ |
| SOCIAL SHARING OF CONTENT | | | | |
| Share Web Content (not uploaded) on Social Media Sites | ◉ | ◉ | ◉ | ◉ |
| Share Uploaded content on Social Media Sites | ◉ | ◉ | ◉ | ◉ |
| SOCIAL SHARING OF BOARDS | | | | |
| Share Private Board on Social Media Sites | ◉ | n/a | n/a | n/a |
| Share Collaborative Board on Social Media Sites | ◉ | ◉ | n/a | n/a |
| Share Ecosystem Board on Social Media Sites | ◉ | n/a | ◉ | n/a |
| Share Public Board on Social Media Sites | ◉ | n/a | ◉ | ◉ |

KEY
◉ (board/content) permissions allow
n/a = not applicable, due to permission settings

Figure 13

SYSTEM AND METHOD FOR PROVIDING A SECURE NETWORK

TECHNICAL FIELD

The present invention relates to methods and systems to provide secure database and network environments having private and public aspects.

BACKGROUND

As digital mobility and geodiversity of workforces increase, content once stored locally is often migrated to digital clouds. A common assumption is that cloud storage is better and cheaper—and by utilizing cloud applications, stakeholder interaction can be more centralized, and therefore convenient. However, many problems exist with cloud applications and storage, and conventional wisdom often glosses over security flaws inherent in each.

SUMMARY

The present invention is generally directed to a secure network ecosystems and methods.

An aspect of the secure network ecosystem can include a URL programming interface, a server, and a database. The server can be configured to receive a request from the URL programming interface. The server can include a file manager, an authentication server, a resource server, and a collaboration server.

In some embodiments, the authentication server can ensures that requests are valid.

In other embodiments, the secure network ecosystem can further include an application program interface (API). The API can be configured to authenticate tokens, which can be generated by the authentication server. Requests can be HTTP communications and/or FTP communications.

Another aspect of a secure network ecosystem can further include a second secure network ecosystem. The second secure network ecosystem can include a second URL programming interface, a second server, and a second database. The second database can be connected to the second server. The second secure network ecosystem can be configured to send and/or receive requests from and/or to the secure network ecosystem. The second secure network ecosystem can be configured to send and/or receive authentication requests from and/or to the secure network ecosystem.

In yet other embodiments, the second server can determine whether requests are authorized based on, for example, a token, which can be generated by the authentication server. The token can have a limited lifetime, for example, less than twenty minutes, less than five minutes, less than two minutes.

In some embodiments, the resource server can include a token validator, a query engine, and a metadata manager. The resource server can include a central repository of metadata. The metadata can be publicly available. The metadata can be associated with content. The content can be publicly unavailable. Filenames associated with the content can be publicly invisible. In some embodiments, the metadata is publicly searchable.

In other embodiments, data on the database can be stored according to the first normal form (1NF), according to the second normal form (2NF), and/or according to the third normal form (3NF). Alternatively, the data can be stored in violation of one or more of the first, second, and third normal forms. The database can be a normalized database, a non-normalized database, or a partially non-normalized database.

In yet other embodiments, the database can contain content and/or filenames associated with the content. The content and/or the filenames can be encrypted. File extensions associated with the content can be encrypted. The database can further contain public content that is stored as plaintext. Data on the database have locations. The locations can be obfuscated. The locations can be stored outside of the database. The locations can be hashed.

Other aspects, embodiments, and features will be apparent from the following description, the drawings, and the claims.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 13 illustrates an exemplary window of permissions for different user levels.

DETAILED DESCRIPTION

Figure 1:
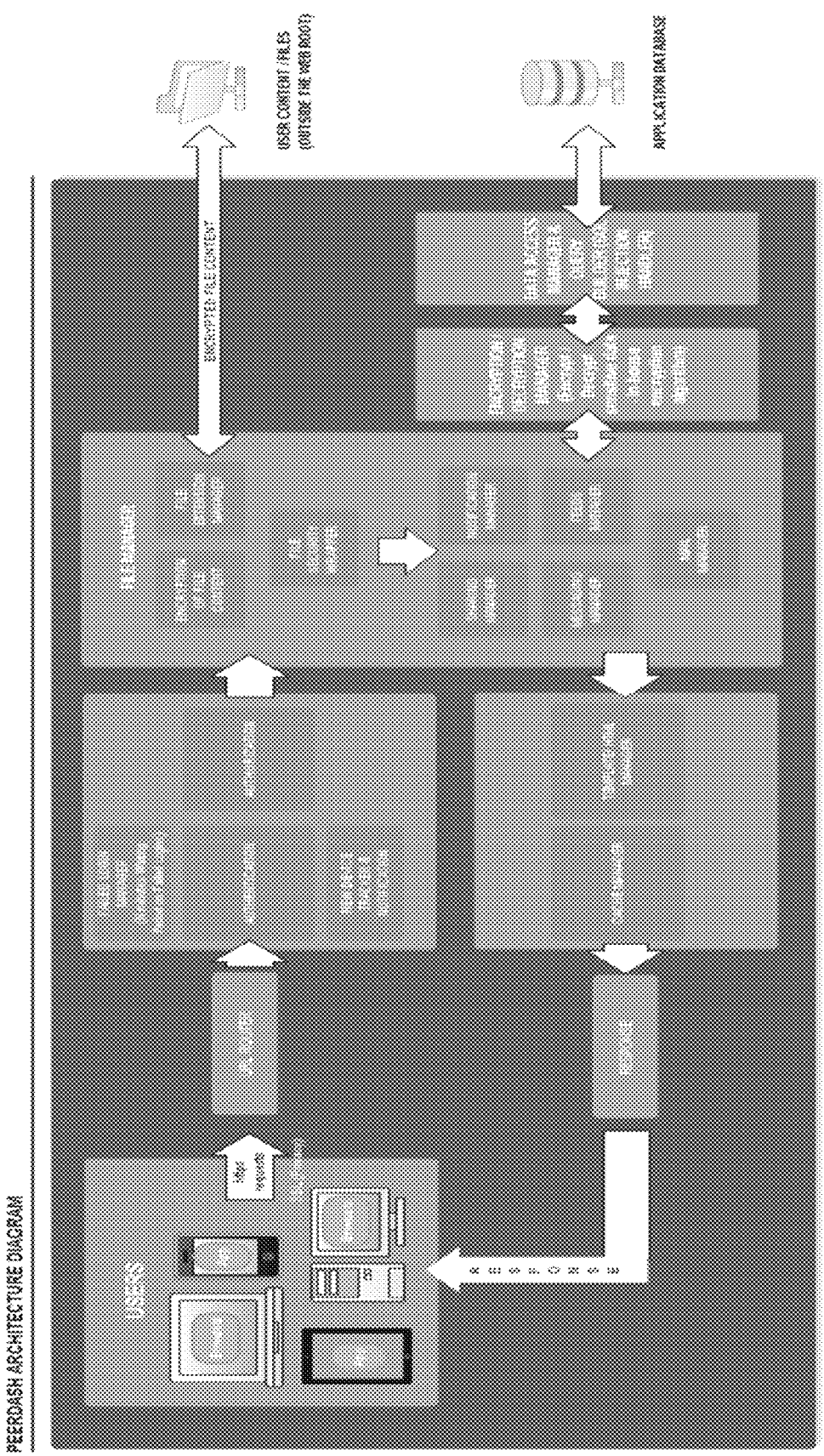
FIG. 1 illustrates an architectural overview of an embodiment.

A detailed explanation of the system and method according to exemplary embodiments of the present invention are described below. Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

The present invention is generally directed to digital ecosystems, devices and methods for establishing and/or maintaining secure networks that can have private and public aspects. The various techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in Various computer-based systems, methods and implementations in accordance with the described technology are presented below.

A secure network can be embodied by general- or special-purpose computers and/or servers and can have an internal or external memory for storing data and programs such as an operating system and one or more application programs. Examples of application programs include computer programs implementing the techniques described herein, authoring applications capable of generating documents or other electronic content; client applications (e.g., an Internet Service Provider (ISP) client, an e-mail client, and/or an instant messaging (IM) client) capable of communicating with other computer users, accessing various computer resources, and viewing, creating, or otherwise manipulating electronic content; and browser applications capable of rendering Internet content and other content formatted according to standards or protocols such as the Hypertext Transfer Protocol (HTTP). One or more of the application programs can be installed on the internal or external storage of the general-purpose computer. Alternatively, application programs can be externally stored in or performed by one or more device(s) external to the general-purpose computer.

The computers and/or servers can include a central processing unit (CPU) for executing instructions in response to commands, and a communication device for sending and receiving data. One example of the communication device can be a modem. Other examples include a transceiver, a communication card, a satellite dish, an antenna, a network adapter, or some other mechanism capable of transmitting and receiving data over a communications link through a wired or wireless data pathway. The systems can also include input/output interfaces that enable wired and/or wireless connection to various peripheral devices. In one implementation, a processor-based system can include main memory and can also include secondary memory, which can be a tangible computer-readable medium. The tangible computer-readable medium memory can include, for example, a hard disk drive or a removable storage drive, a flash based storage system or solid-state drive, a floppy disk drive, a magnetic tape drive, an optical disk drive (e.g. Blu-Ray, DVD, CD drive), magnetic tape, paper tape, punched cards, standalone RAM disks, Iomega Zip drive, etc. The removable storage drive can read from and/or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In some embodiments, the tangible computer-readable medium memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or flash memory) and associated socket, and other removable storage units and interfaces, which allow software and data to be transferred from the removable storage unit to the computer system.

Aspects can include a network with a knowledgebase and a content management system (CMS). The CMS and publishing platforms can be utilized to facilitate, e.g., social media, knowledgebase collaboration, curation, public relations, recruitment, sponsorship, and/or marketing. The network can be hosted by one or more servers, such as a Web server and/or server farm and can provide private and/or public access such as portals and webpages. The server can include file servers and/or database servers, which can be dedicated and/or multiprocessing-type operating systems. The server can include mail servers to move and/or store mail over corporate networks (e.g. via LANs and/or WANs) and/or across the Internet; web servers to load and serve data across the Internet (e.g. via browsers using HTTP); server platforms that can include underlying hardware and/or software to drive the system; application servers that can provide middleware between database servers and end users; real-time communication servers, chat servers, IRC servers, and/or instant messaging (IM) servers that can facilitate the nearly instantaneously exchange of information; File Transfer Protocol (FTP) servers that can facilitate transfer control and/or the secure transfer of files; collaboration servers; list servers; telnet servers; open source servers; and/or virtual servers. Server, as used herein, can refer to programs that manage resources and/or to physical computer systems. For example, in an embodiment, the server can include a 64-bit, four-core, 2.0 GHz per core (or faster) processor. The server can further include 4 GB of RAM for staging and/or 8 GB of RAM for production. The server can include a 500 GB drive for staging and a 1 TB drive for production; but, it would be appreciated by a person having ordinary skill in the art that disk space requirements, as with other computer requirements, can vary widely based on user needs and preferences. In an embodiment, the server can include an operating system such as the 64-bit CentOS; a secure database can comprise an open-source relational database management system such as MySQL 5.6; and the web server can be implemented with Apache and utilize PHP. In some embodiments, open ports can include 80, 443, and 8081 (for real-time messaging).

Tables I and II describe exemplary hardware and software configurations that can be utilized for certain embodiments. The tables are intended to provide context to a person having ordinary skill in the art and are not intended to limit any particular embodiment or invention. A person having ordinary skill in the art would appreciate that the exemplary values can be adjusted to meet the needs and preferences associated with implementation. For example, hard disk space can be dependent upon the quantity and type of content being curated as well as upon the level of participation expected and/or allow for each type of user. Further, the software utilized can be chosen for a particular design preference, project needs, and/or hardware requirements.

TABLE I

Exemplary Server Hardware

| Processor | RAM | Hard Disk Space | Platform Size |
|---|---|---|---|
| 64-bit, 2 cores | 8 GB | 1 GB to 2 TB per user | Small deployment (e.g. 100– users) |
| 64-bit, 4 cores | 16 GB | 1 GB to 2 TB per uses | Medium deployment (e .g. 100-200 users) |
| 64-bit, 8 cores | 32 GB | 1 GB to 2 TB per user | Large deployment (e.g. 200+ users) |

TABLE II

Exemplary Server Software

| Description | Value | Version |
| --- | --- | --- |
| Operating System | 64-bit | Linux, e.g. CentOS, Red Hat, Ubuntu |
| Web Server | Apache | Version 2.4x and above |
| Database | MySQL | Community Edition 5.x and above |
|  | PHP | Version 5.6x and above |

FIG. 1 illustrates the architecture of an embodiment Users can send HTTPS requests via SSL connections from their devices (e.g. laptops, desktops, and/or mobile devices). The requests can be routed for processing through an authentication module, where credentials can be compared to those on file, e.g. in a secure database of authorized user information which can be on a local operating system or within an authentication server. Credentials to be authenticated can include the specific device from which an HTTPS request originated, and if the specific device is not registered or known, a notification can be sent to the user of attempted accessing by an unknown device. If the credentials match, the user can be granted authorization for access to a file manager. The file manager can include a module for encrypting file content, a file extension manager, and/or a file security wrapper module. The file manager can control user content and files, and can further include managers for file sharing, notifications, messaging, feeds, and/or mail. The file manager can also be in communication with an application database via, e.g., an encryption/decryption manager, a data access manager, and a query builder such as an SQL query builder. The encryption/decryption manager can encrypt and/or decrypt data, such as sensitive data, and can utilize a purpose-built encryption algorithm and/or a known or publicly available encryption algorithm. The file manager can further send responses (to a user's initial URL request) via a cache manager and/or template/HTML manager.

Different encryptions can be utilized in various embodiments. As an example, a content access key can be encrypted using, e.g., AES-256 encryption with a 32-bit key via the mcrypt PHP extension. IDs, which can be passed through URLs, can be encrypted using, e.g., normal encode hashing mechanisms with different keys for each module. Each module can be configured with different key. File content can be encrypted using, e.g., AES-256 encryption with a 32-bit random key via the mcrypt PHP extension. This can be a user-controlled functionality, and can be performed, e.g., if user selects to encrypt while uploading a content. User passwords can also be hashed using a strong one-way hashing algorithm (e.g. bcrypt) before storing in database to enhance security.

Database—Hosting and Security

Companies face the increasingly daunting task of communicating vast quantities of knowledge created and shared between employees, stakeholders, customers, decision makers and others. Often multi-institutional, this information can run the gamut from private files to inter-organizational collaboration, to public outreach. While smaller companies might garner savings with public cloud storage due to their limited needs (i.e., small websites/data stores, low IP concerns, and mostly internal or ad hoc projects), many institutions, especially large ones, typically benefit more from private cloud hybrids. Security protocols and data organization should be serious concerns, and may require organization-level physical security and/or regulatory requirements to develop and implement best practices.

Embodiments can meet such challenges, offering multiple deployment options to meet an organization's cloud strategy needs. For example, a private cloud can be hosted as a standalone, secure cloud database. A private cloud can be hosted through a third-party or on an internal, organization server via cloud applications for existing databases and/or servers. Embodiments can be implemented through a hybrid cloud, e.g. on multiple servers with a bridge between private and hosted servers, or through a hybrid cloud and a public cloud. This flexibility can allow organizations of different sizes and needs to tailor their cloud strategy and ramp-up, while coherently addressing security concerns and effectively managing resources. With flexible designs, multiple implementation models, and secure, cloud-based, cross-server functionality, embodiments can adapt to evolving enterprise and business needs.

The platform can transform data, e.g. through encryption and/or obfuscation, to significantly increase security. Primarily for security reasons, embodiments can transform and/or obfuscate information at multiple levels. This can create a labyrinth to thwart a would-be hacker seeking to get information from the system. Additionally, data location can be obfuscated such that the database lacks sufficient information to help someone determine the location of files for that user within the server. Preventing the making of connections between a user and their files on a server can make unauthorized data retrieval practically impossible.

To provide further security, the location of data stored outside of the database can also be hashed to make it challenging to determine which folders inside the platform correlate to which users. This can be important because if it is known where files are stored for a particular user, it can be possible to retrieve their uploaded documents and other files, for example, through the use of brute force of opening and reading each file.

Additional layers of security can be implemented such as file name and content obfuscation and URL link obfuscation. If an unauthorized user were able to determine the location of certain files on a server, the platform can provide further obstacles to data breach by hashing the name of each individual folder and file, including the file extension. This can render the task of determining file content impracticably laborious. URLs that are shown to the users can be virtual URLs such that the actual link is not shown. Rather, fake URLs can be shown, and the actual URLs can be determined in real-time (i.e. on-the-fly) by the application. This can occur at the board level and/or the file level. URL obfuscation and/or encryption can eliminate the ability to share URLs with other users (a security risk and problem with previous systems that is often implemented with email and text authorization). These additional layers provide further shields of the actual location of the content from the user that can prevent unauthorized users from accessing the data.

File Management & Storage—Centralized Knowledgebase

Organizations often struggle to utilize clouds and cloud technology as means for centralizing information for stakeholders (employees, customers, contractors, investors, etc.). Two types of SaaS models have been used for organization of a knowledgebase, specifically communication apps (for leveraging project data) and cloud apps (based on legacy file-storage architecture). Truly effective knowledgebase design, however, can leverage a centralized, secure database with decentralized administration for greater stakeholder participation. Embodiments herein can achieve such goals by utilizing several features. For example, users can collect, collaborate, and annotate files within thematic folders, creating contextualized resources. Content can have ownership, and file permissions can be set to private, shared with groups, or published to the public. Content and files can be accessible via a central cloud UX. The platform, or app, can be file-type and file-size agnostic. These features can be considered important but should also be balanced as user/business preferences dictate to account for security and/or increased IT/administrative workload.

File management and storage can further utilize aggregating/communications models and file storage models. For SaaS providers employing architectures such as Jive, Yammer, and Slack, content that is accessible within the app is not necessarily centralized. Instead, the app can rely on simple API calls to serve content from multiple systems. Although searchable, such apps only address communication and result in systems or methods that have a social layer offering only short term productivity (e.g. comments on files); search-only contextualization can limit the impact of human intent and an organization's ability to leverage data; and security dependencies can be multiplied as other applications are accessed for basic functionality. Additionally, aggregation-style apps are typically organized within social streams or project files. Both models can be ineffective for large scale document sharing and can become silos within themselves—e.g., losing a post in a Facebook stream or searching through group emails for relevant files. File storage models (e.g. file sync and share, or FSS) have been utilized in other cloud apps, such as Box and Dropbox. The user experience (UX) merely mimics legacy systems—files are uploaded, folders are nested, and permissions (in enterprise versions) are based upon pre-set roles within the organization. In such familiar, legacy file-storage architecture, files are typically assigned a role-level, and all files beneath that level can be viewed. This hierarchal remnant of machine-thinking can hamper security efforts and can be a hindrance in a high-sharing environment. Moreover, IP security can be violated when role-based access permissions automatically extend to multiple folders that cannot be severed. Role-based (rather than content-based) permissions can be a major contributing factor to large-scale data theft. Likewise, file storage apps (and most aggregator-type apps) often force users to go outside their system to share files when permission management is untenable. An important aspect in creating a convenient and effective knowledgebase can be the utilization of a blended model, i.e. combining secure database integration, content ownership, and control of user information.

Accordingly, embodiments can be implemented with a blended hosting model without the limitations and security risk associated with other systems. When hosted by a third-party, the application can function as a file storage model. When used as a bridge between servers or organizations . . . or, as part of a cloud ramp-up strategy—the application can mimic the aggregation model. Embodiments can be uniquely qualified as a knowledgebase, designed and developed as a social, decentralized resource library and collaboration platform with secure IP transfer. Familiar social media interface styles and/or features can incorporate user-profiles and comments, following people, organizations and departments, and subscribing to resources and projects. The knowledgebase can be user-populated; stakeholders can upload content (if permitted), edit and create boards, and update metadata and annotations.

Some embodiments include a decentralized system having features such as: admins/sub-admins, who can set user permissions (share, collaborate, or publish) and can automate administrative review procedures; administration of groups can be assigned to users within the organization or external collaborators for virtual ecosystems and multi-stakeholder collaboration; users can manage their own content, from uploading and organizing to annotation and publishing within their security parameters; organizations can leverage in-house and partner resources, review workflow and business decisions and efficiently participate in cross-organizational projects.

Embodiments can utilize a secure database that has normalized and non-normalized aspects. The data normalization can involve three basic levels: First Normal Form (1NF); Second Normal Form (2NF); and Third Normal Form (3NF). Database normalization can include 1NF normalization such as the elimination of duplicate columns, separation tables, and the use of primary keys. The platform generally meets the 2NF database normalization requirements, i.e. the use of foreign keys to remove redundant data and storage in separate tables. But, the platform can advantageously violate this protocol. For example, instead of having one record for each curated URL—that each subsequent user shares—each user that curates a URL can have their own record, even if such a record has been previously added. This can allow the content to be manipulated on the page (unlike, e.g. Pinterest) as well as the permission scheme to function. The platform can be implemented with 3NF normalization, such as the removal of columns that are not dependent upon primary keys. For example, subscribers and likes can be stored in the table for UX and analytic. This normalization, however, can advantageously be violated with regularity to improve performance.

Embodiments can include a CMS for document and/or media management and additional applications for project management and/or multi-enterprise collaboration. The CMS can include a centralized repository, a user-curated knowledge base, and a secure external drive alternative.

Any user with authorization can upload files or collect web content to the centralized repository. Centrally locating resources can reduce transfer costs and avoid administrative bottlenecks. Users create and organize curations of contextualized data and can add/edit metadata, which can ensure accuracy for local and/or public searching. Administrators can control user-permissions and can allow users to control their own content-permissions for decentralized tasks, such as collaboration, content/database building, small team review processes, IP transfers, etc.

User-Curated Knowledge Base

Profiles can be searchable. Users can be connected to content they create, identifying project ownership, organizational leadership, and/or the industry focus of the users. Users can connect via social business tools to thought-leaders, internal/external collaborators, and potential stakeholders. The platform can also allow subscribing to user content, which in turn can support business collaboration, industry sponsorships, strategic alliances, cross-discipline research, and media-rich learning. Moreover, the platform can be implemented with a familiar and/or intuitive interface, such as a social interface, that can facilitate participation, contextualization of complex ideas, and reduce administrative workload.

Secure External Drive Alternative

To enhance security, embodiments can be installed on an organization's servers and/or in a privately hosted cloud, negating security concerns over IP transfer through external vendors. Granular, content-level access permissions can be attached to files, rather than individuals, thereby limiting user access to specific content, not levels within a database. In some embodiments, content cannot be accessed independently (e.g. by link), and private files can remain within an organization's knowledgebase by limiting viewing/downloading by user session information and/or associated permissions.

Figure 2:
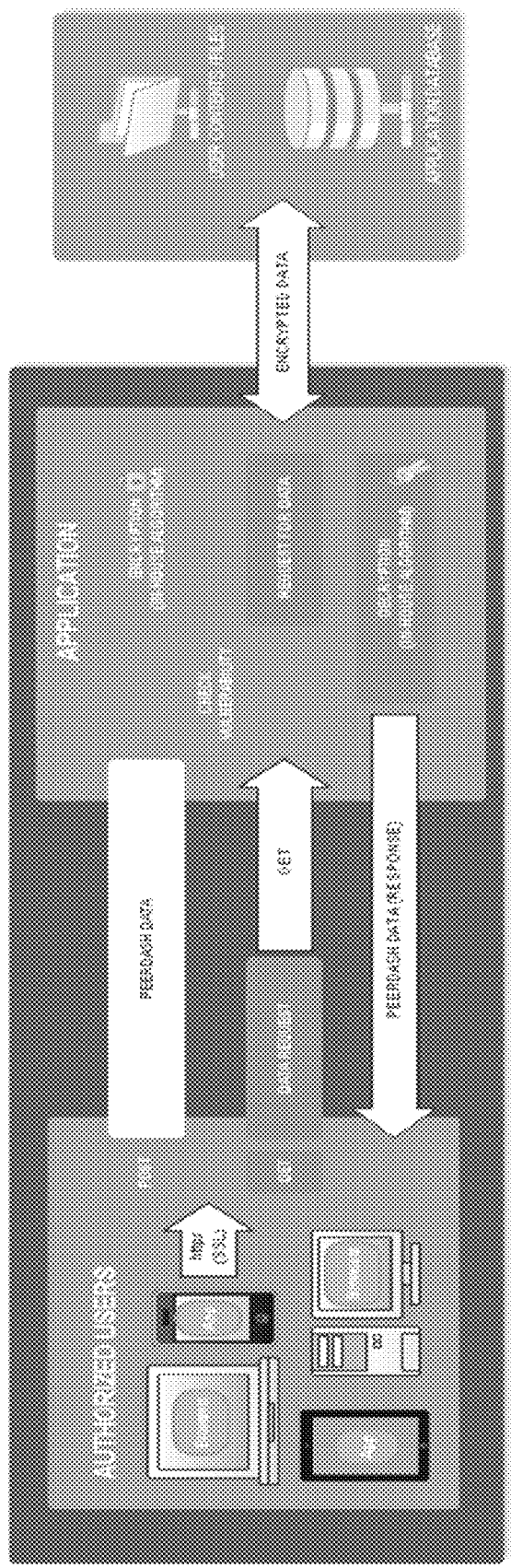
FIG. 2 is a diagram of dataflow in an exemplary embodiment.
Figure 3:
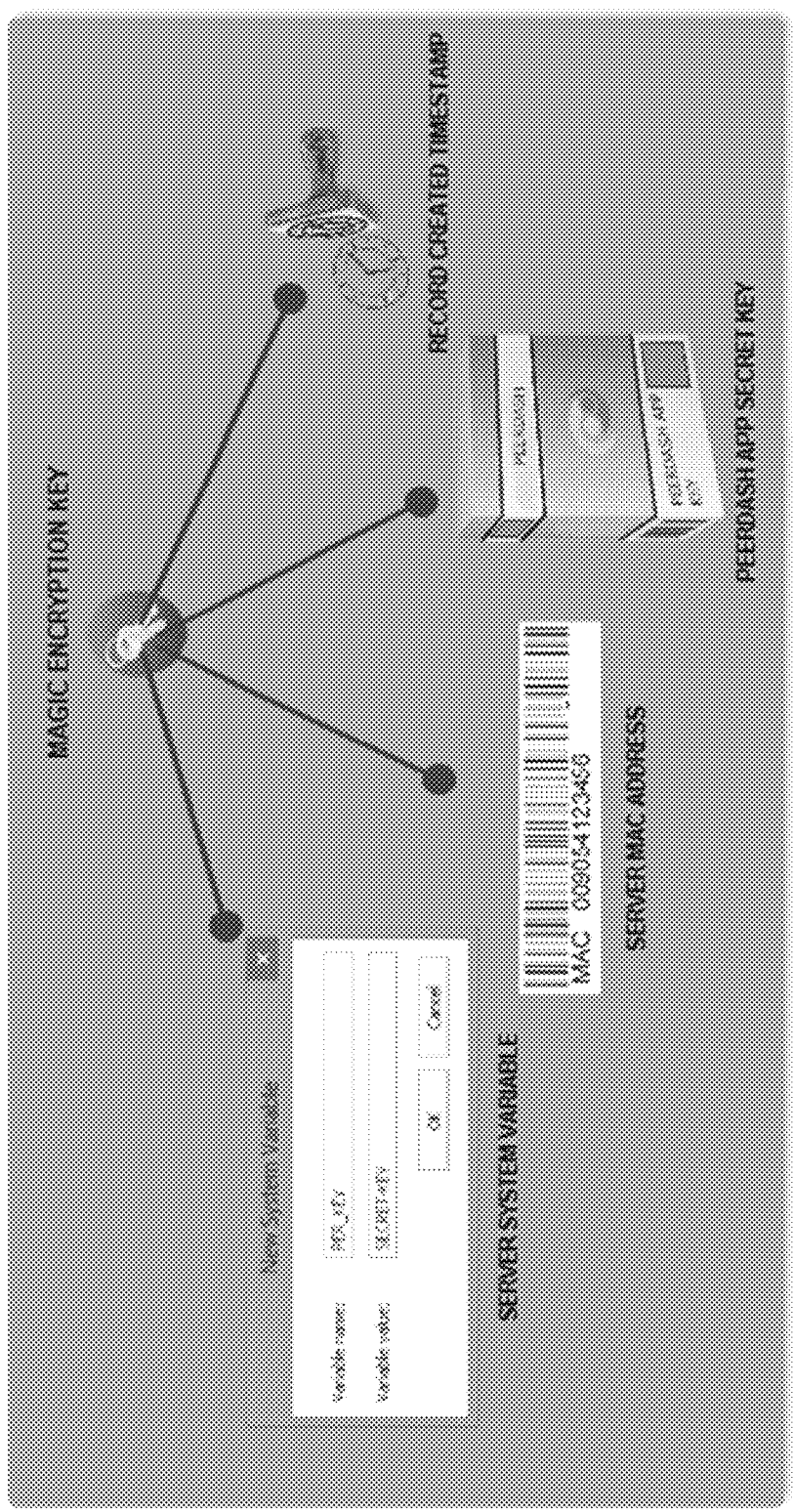
FIG. 3 illustrates encryption and decryption for an exemplary embodiment.

Additional applications can include secure IP and file transfer, social business tools, centralized, real-time communications, social media tools, branded platforms, marketing, and PR asset management. FIG. 2 illustrates a diagram of dataflow in an exemplary embodiment. Authorized users access the platform from their individual devices. Platform apps can perform authentication and encryption/decryption, as well as access an application database and user content/files. Encryption and decryption, depicted in FIG. 3, can include a secure encryption key that utilizes a plurality of information, such as server system variables, server MAC addresses, secret keys, and/or timestamps.

Peerdash Activation Server

Embodiments can include a Peerdash activation server (PAS), a group of technologies that can ensure security for content sharing, collaboration and communication within the ecosystem. PAS can facilitate the sharing of information with users of separate ecosystems, without the need to grant direct access to the server hosting the ecosystem. All ecosystem-to-ecosystem access requests can be managed by PAS, thus allowing users from different ecosystems to cooperate as if they belonged to one unified system. The core technologies can include one or more of a PAS authentication server, a PAS resource server, and a PAS collaboration server.

The PAS authentication server can ensure that requests are valid. Requests can take many forms, including performing a search, uploading metadata, collaborating, etc. Before a request can be fulfilled, a token can be granted from the PAS authentication server. The token can have a limited life to combat hacking and/or spoofing. While the lifetime of a token's validity can be, e.g., two minutes, fifteen minutes, or as long as desired, the lifetime in a preferred embodiment can be limited to a few minutes or less to enhance security. The token can also be passed to external ecosystems, if such a request is made, and that token can also be validated through the PAS authentication server prior to passing back any data. The PAS authentication server can be responsible for validating any or all requests within the ecosystem.

A PAS resource server can be a central repository of public metadata across the ecosystem. Public information from each ecosystem (e.g. profiles, boards, content, etc.) can be uploaded periodically to the PAS resource server for indexing and/or ranking. This data can be used to return relevant search results to users performing searches inside or outside their ecosystems. The PAS resource server can include a token validator, a query engine, a metadata manager, and/or an indexing/ranking engine.

Figure 4:
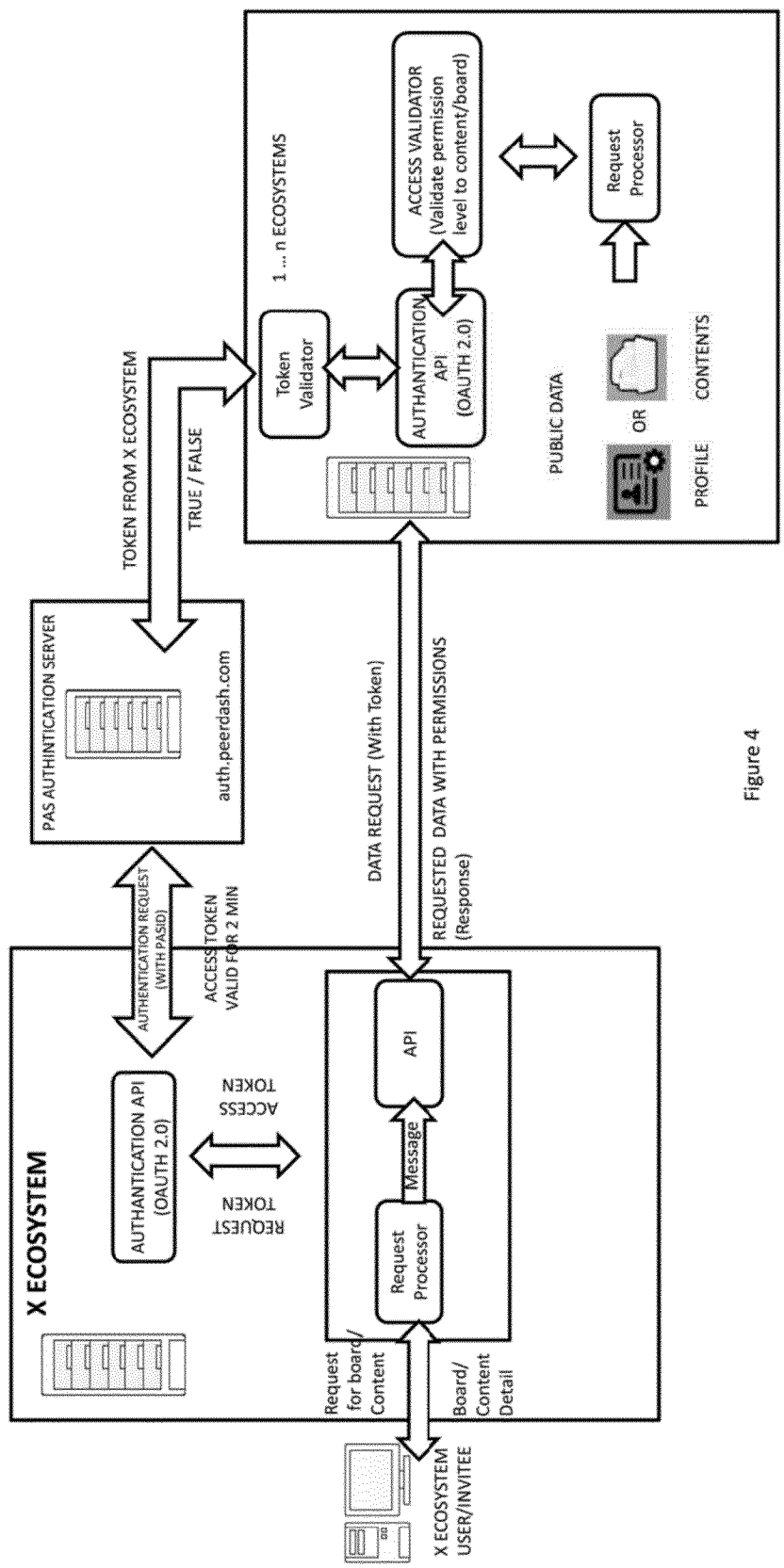
FIG. 4 depicts an exemplary embodiment including a PAS.
Figure 5A:
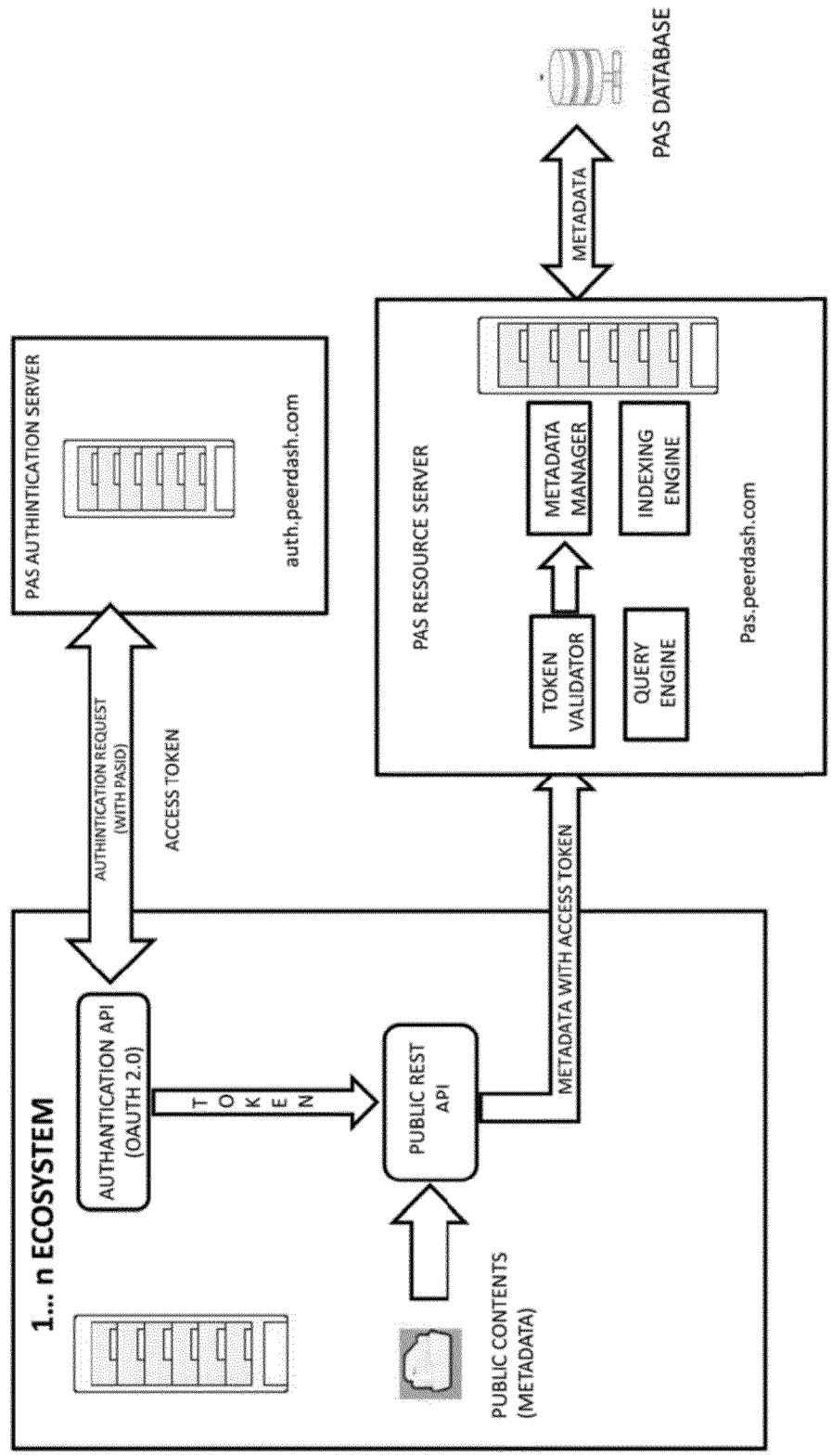
Figure 5B:
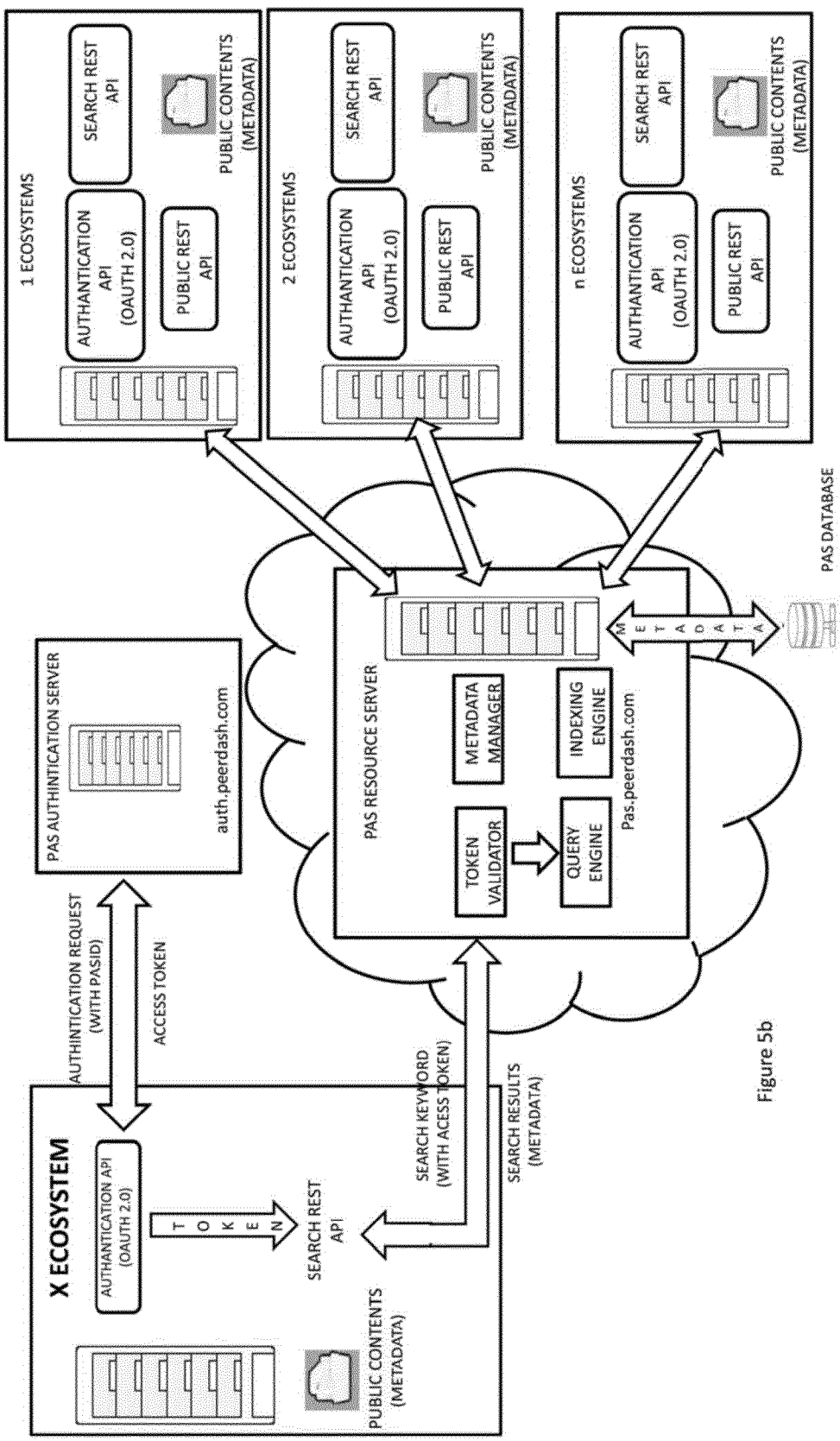
Figure 6:
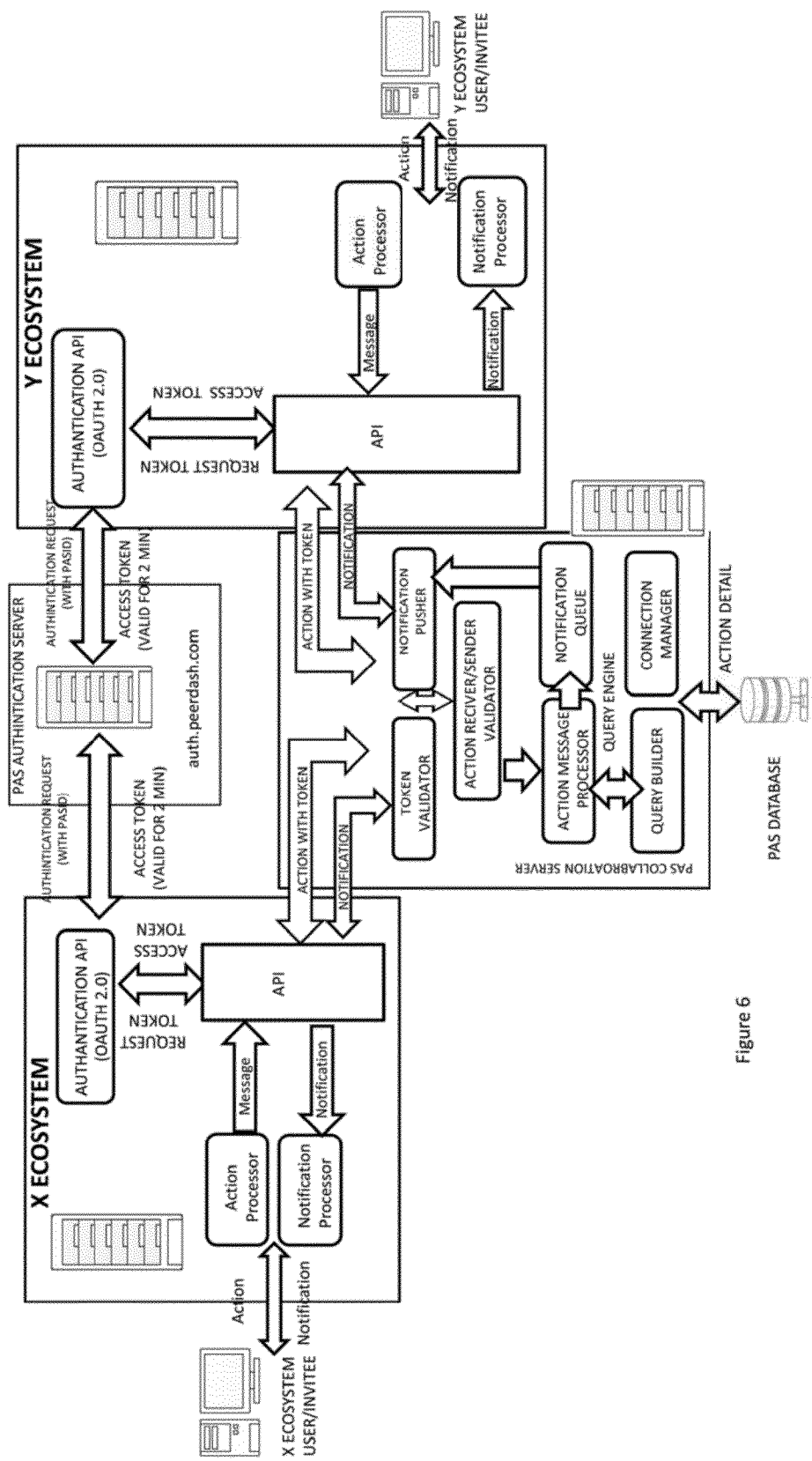
Figure 7:
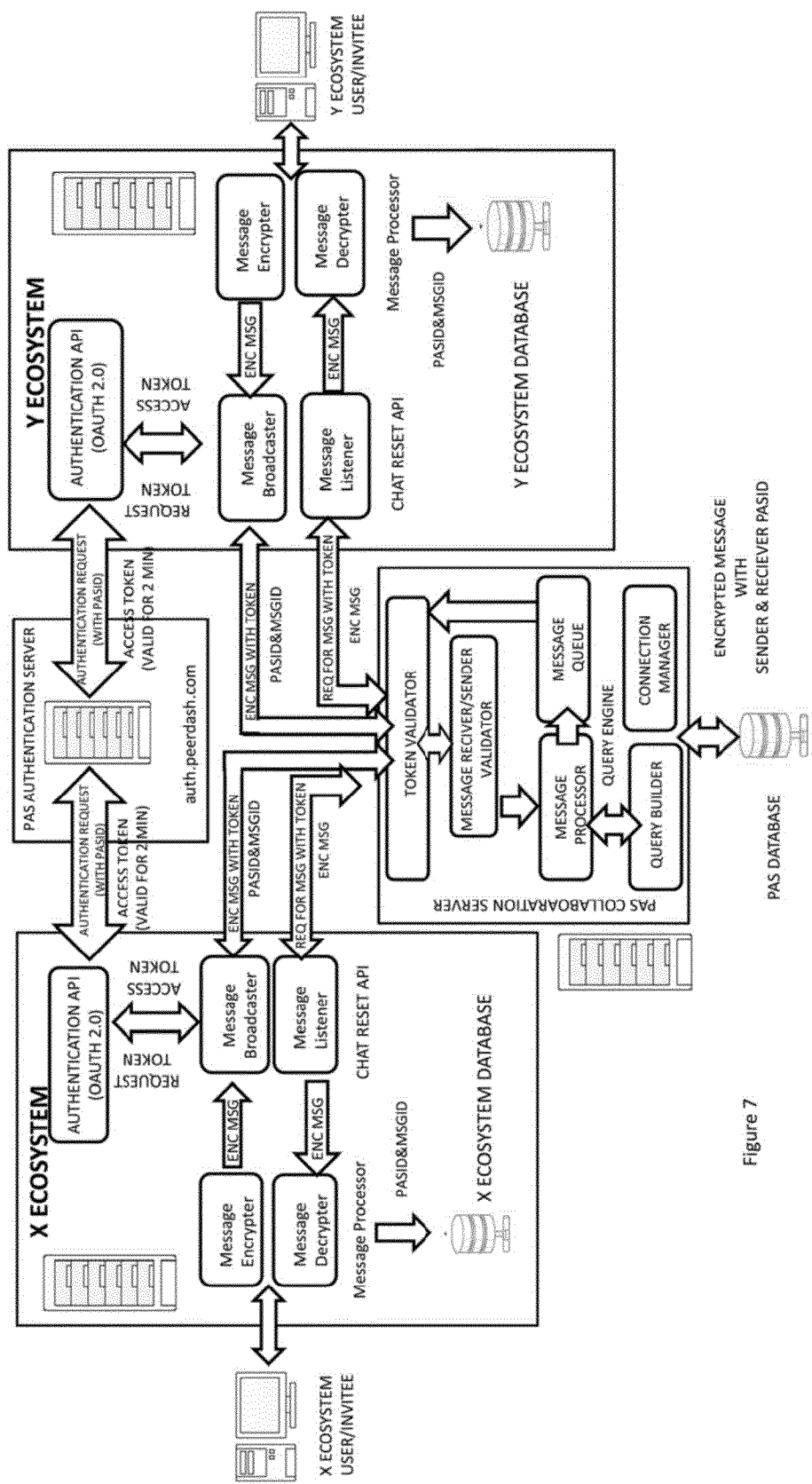
Figure 8:
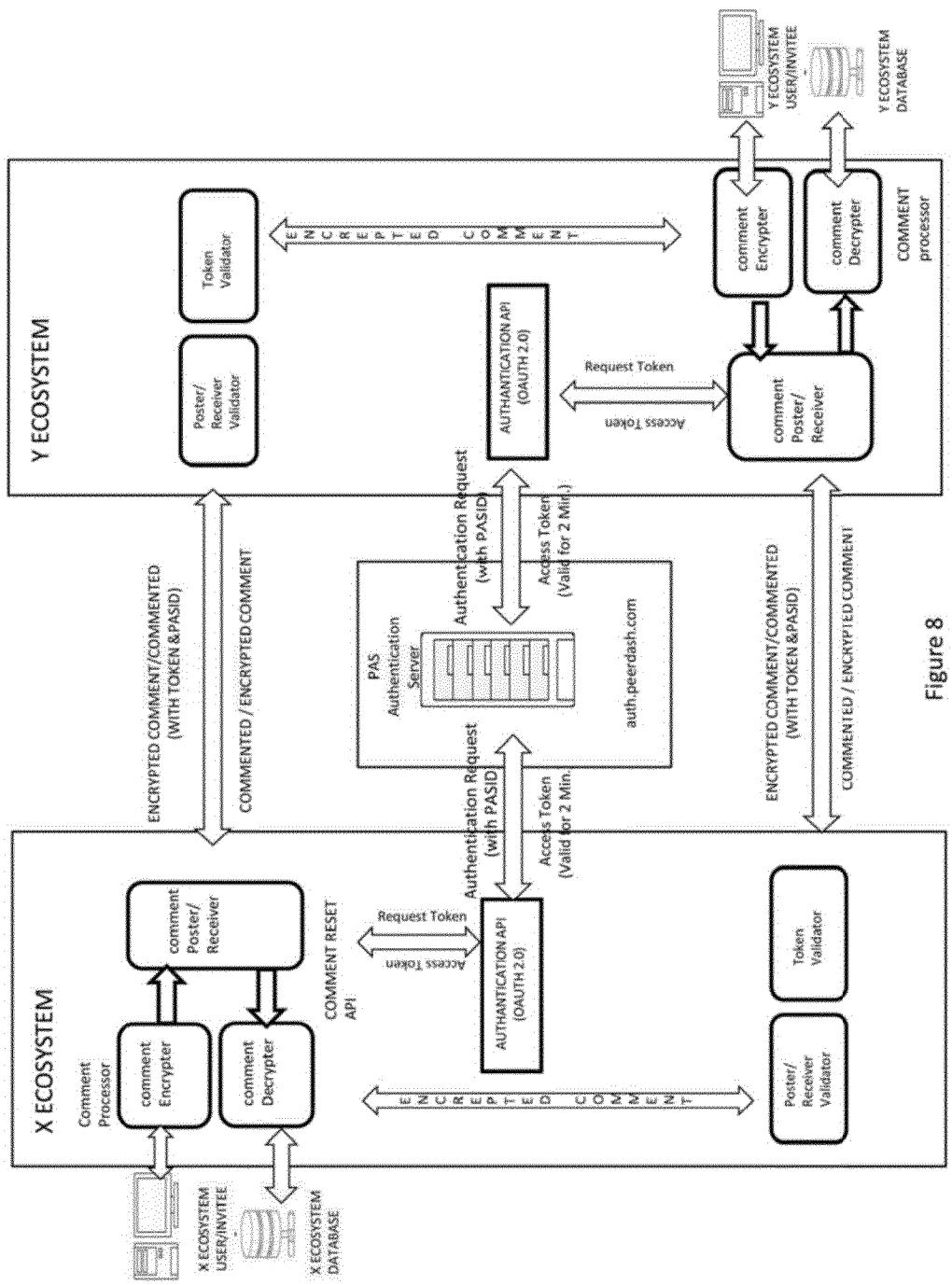

FIG. 4 depicts an exemplary embodiment including a PAS. As is shown in the figure, the X ecosystem includes a non-standard usage of OAuth (2.0) authentication API that does not include private user information, and instead can reference the PeerID generated on the local level. When an X ecosystem user or invitee requests access to a board and % or content, the request processor can communicate via the authentication API with the PAS authentication server, which in turn can, if appropriate, generate a token. The request can then be forwarded to the N ecosystem, and separately the N ecosystem can communicate with the PAS authentication server for token validation purposes. If authorized, the N ecosystem can process the request and return an appropriate message and/or content to the user via the X ecosystem platform. To the X ecosystem user, the entire process is seamless.

Figure 5A:
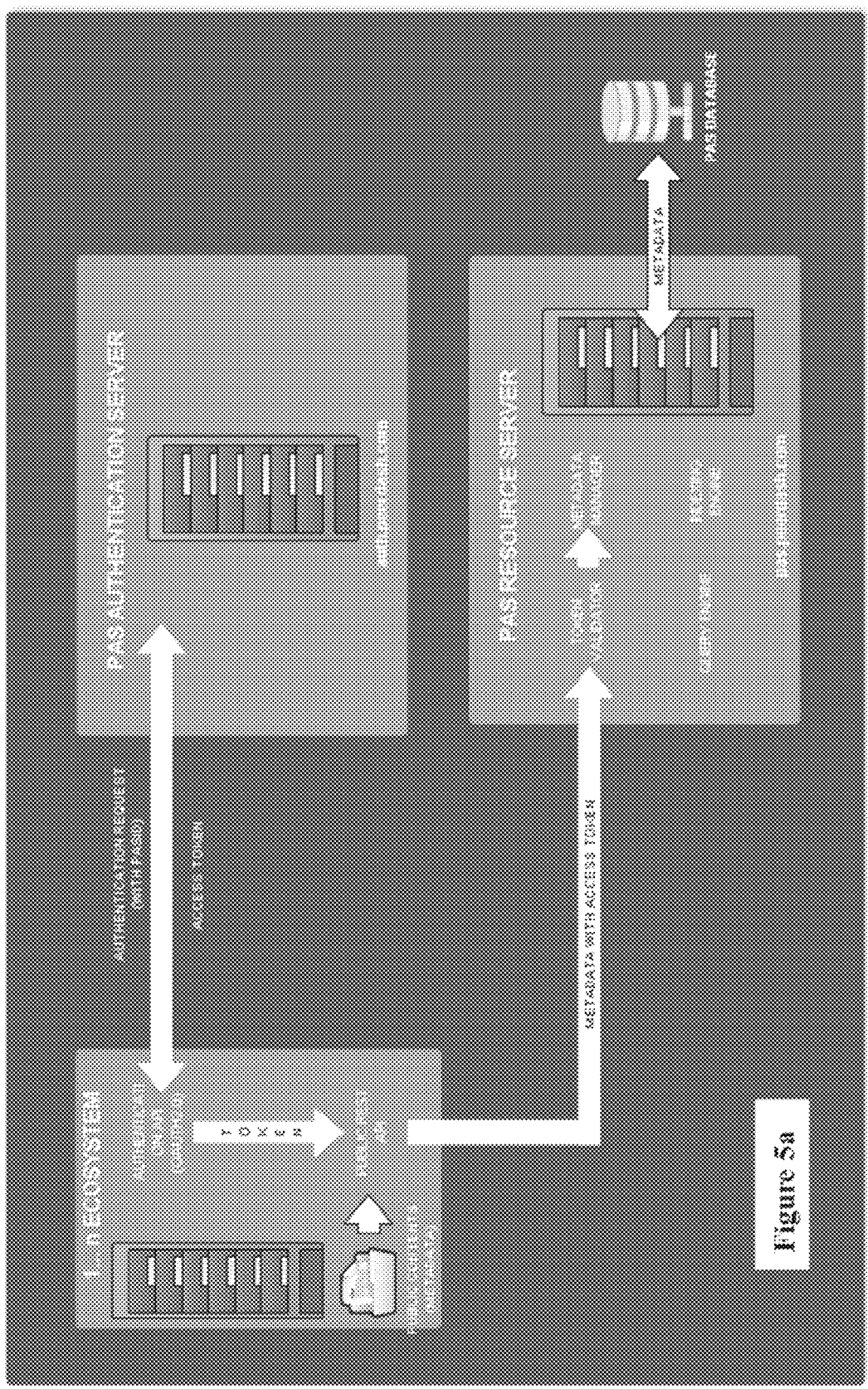
FIG. 5a illustrates an exemplary dataflow.
Figure 5B:
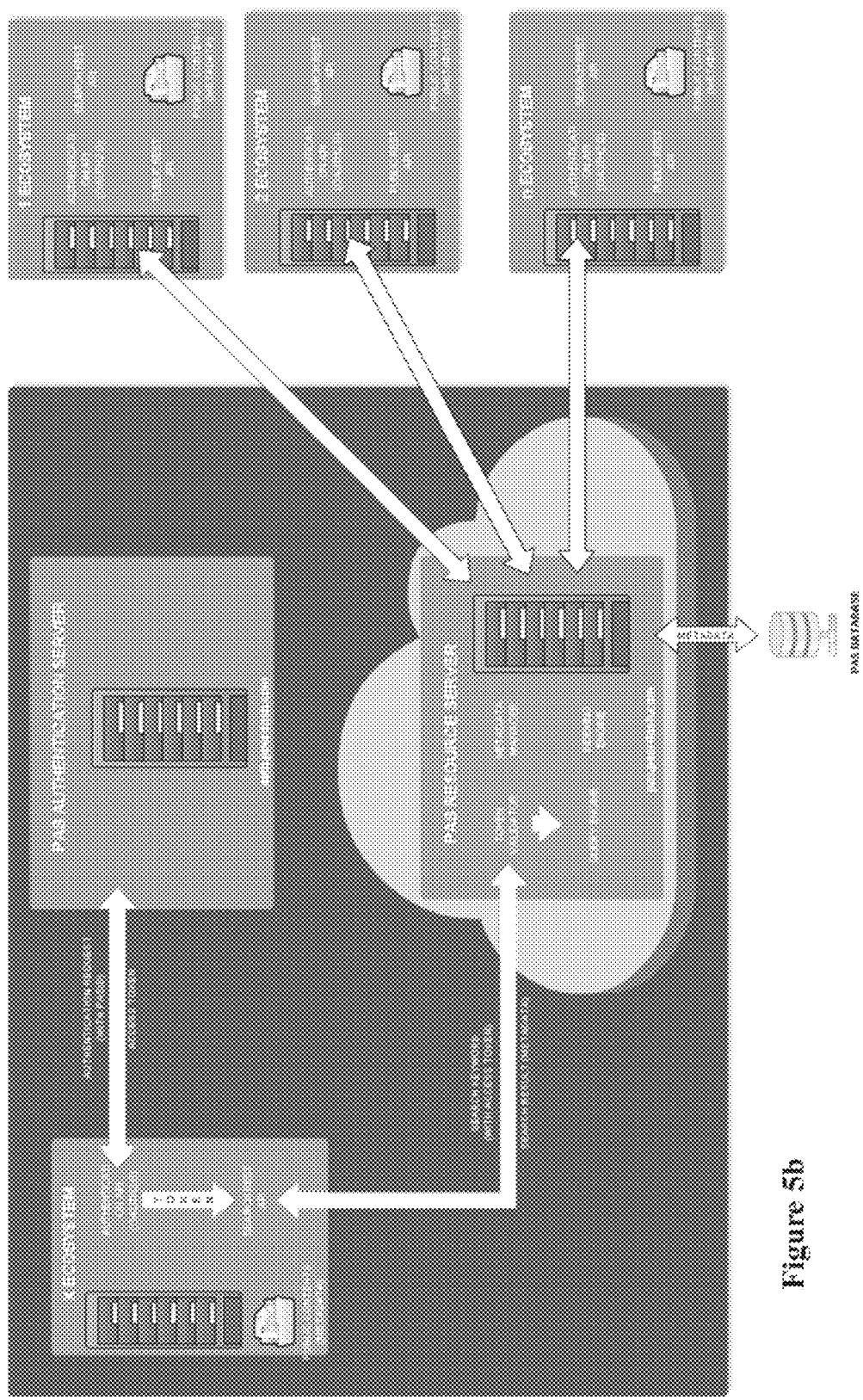
FIG. 5b illustrates an exemplary dataflow.
Figure 5C:
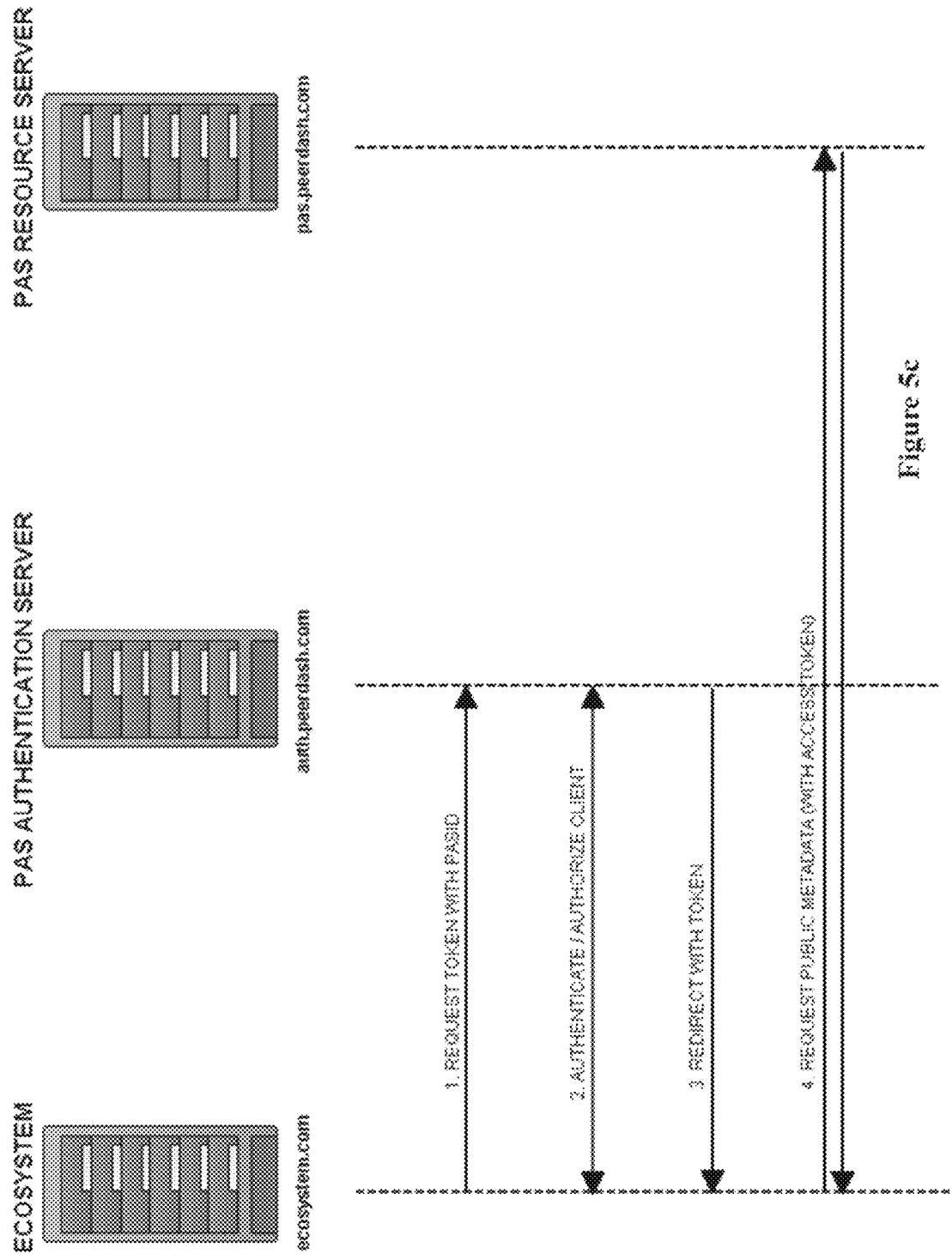
FIG. 5c illustrates an exemplary workflow.

FIG. 5*a* illustrates and describes the exemplary flow of data when sending metadata associated with stored public content to the PAS. FIG. 5*b* illustrates and describes the exemplary flow of data when searching public content hosted by a plurality of ecosystems. FIG. 5*c* illustrates and describes workflow, with OAuth (2.0), when searching public content.

Figure 6:
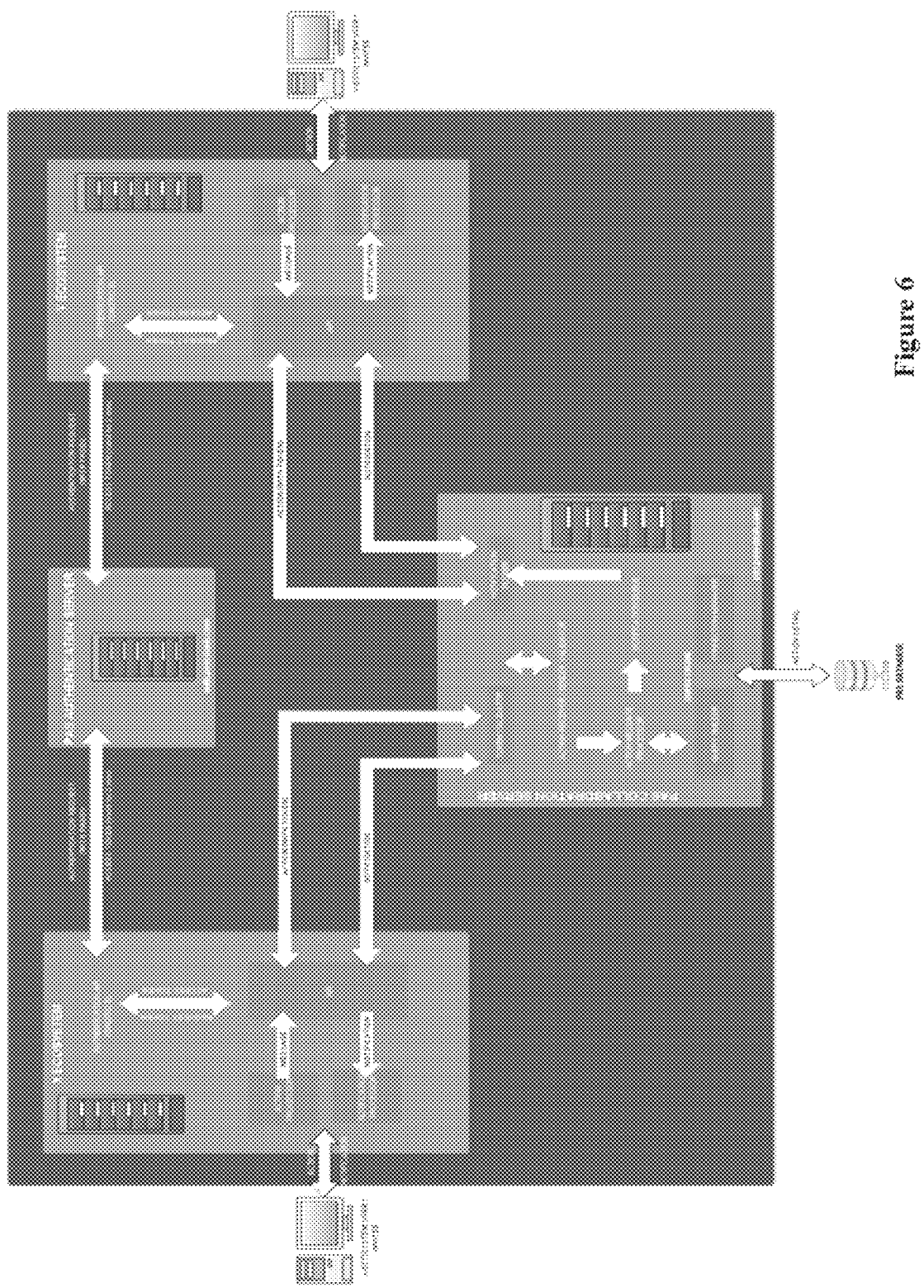
FIG. 6 depicts an exemplary PAS and notification dataflow.

A PAS collaboration server can be used to facilitate collaboration requests and/or notifications between ecosystems, as shown in FIG. 6. This can be useful, for example, when User A attempts to collaborate with User B, and both users belong to different ecosystems. The PAS collaboration server can include a token validator, a connection processor, a notification queue, and a query engine. FIG. 6 depicts additional exemplary elements of a PAS and data flow during ecosystem-to-ecosystem notification.

Administration

The simplicity required to effectively administer a knowledgebase can be directly related to an application's ability to decentralize administration and curation, which can increase stakeholder participation, reduce administrative bottlenecks, and lower transaction costs. With some prior apps (such as Dropbox), a dedicated IT manager is required for a branded platform. For others (such as Yammer), IT staff is required to manage and maintain supporting apps and databases. Prior aggregated/communications apps generally require additional user training due to the difficulties in learning and administering multiple external apps. Complexity is increased with role-based permissions (versus content-level permissions tied to identity) as well as engagement costs associated with the ongoing administrative review of files, connections, and collaborations. Present embodiments can address such problems by providing a centralized CMS with decentralized administration, both of which can be scalable. Additional advantages can be gained from stakeholders sharing responsibilities, from sub-administrators to user-generated content, including annotating, hash-tagging, and/or contextualizing, etc.

Embodiments can incorporate human design principles in a UX with architecture that can facilitation the aggregation of the knowledgebase. Although embodiments can function like a scalable CMS, the platforms can be designed to mimic social media functionality to achieve simple usability and administration. A range of content-related permissions can be employed at each user/owner level. Admins/sub-admins can set user permissions (share, collaborate, and/or publish) and can automate administrative review procedures. Administration of groups can be assigned to users within an organization or external collaborators for virtual ecosystems and multi-stakeholder collaboration. Users can manage their own content—from uploading and organizing, to annotation and publishing—within their security parameters. Organizations can leverage in-house and partner resources, review workflow and business decisions, and efficiently participate in cross-organizational projects. Embodiments can facilitate geographically diverse ecosystems, each with different roles and responsibilities, to achieve common goals. Administrators can create sub-administration with one click, giving ecosystem partners control over their own stakeholders. The actions of both sub-administrators and users can be monitored, e.g., at the administrative level. Review and approval capabilities for external communications can be handled in real-time (e.g. notification/approval of individual action) and/or by pre-setting user permission controls for a class of stakeholders. A cross-organizational level of hierarchal control can task users with a broad spectrum of responsibilities.

Embodiments can be configured to facilitate the creation of ecosystems. For example, an administrator can first create an ecosystem. The name and description of the ecosystem, and if desired a logo, can be chosen and/or uploaded. Users that will be neighborhood admins can be added. Both ecosystem and neighborhood admins can add users, if desired. Adding users can follow the same process as neighborhood admins, but users should not generally be given admin roles. Use permissions can be chosen so as to allow users to upload and/or share (e.g. to social media). Users can be restricted when added. This can be ideal for outside collaborators. For example, by allowing upload but not share, such outside collaborators can be prevented from speaking for the organization through social media and/or publish boards. Once neighborhoods are established, user roles and affiliates can be edited. This feature can be ideal for rotating stakeholders. Profiles can be created and edited. Profile photo can be directly uploaded and profile fields filled in. Areas of interest/expertise associated with users can be utilized to increase SEO. A user's social links can be standardized, and internal organizational profile demographics can be include and made private for analytics uses inside the organization.

Users can be given personal user pages. Pop-up menus can be utilized to add boards, including titles (e.g. having less than 25 letters) and description (which can utilize use hashtags for SEO). Boards can originate as private and can be changed via permissions. Curate (or collection) of Web content can be facilitated by drag-and-drop functionality, such as a Curate It! button on a tool bar. New Boards can also be created while curating. Users can upload documents and/or media to boards. Users can also give upload permission to other users. Subscribe and follow functionality can be incorporated to, e.g., build libraries—either for a user's own page or a page that the user administrates. Subscribed boards can automatically appear in the user's page, e.g., in a panel under a subscribed tab. Collaborative boards from other users can also appear under such a Subscribe tab, and alerts to the user of new content can be generated and sent to the user. Followed pages can appear on the user's page or under a tab as well.

Neighborhood pages can be created. Title and descriptions of the page can be included by Admins or authorized users. Admins can use drop down menus to switch pages for editing and adding announcements. Embodiments can include collaboration features. For example, to connect to other users, a search tab on a user's page can be utilized to go to a user page and/or to select to connect. Connecting with other users can create a contact list. Buttons can also be incorporated to choose to chat, message, and/or block a user. Board permission settings can be utilized to invite others to a user's board. Ecosystem publishing can broadcast boards to the entire ecosystem or to specific users. Users can be controlled from when they are added (e.g. to allow upload but not sharing). Neighborhood admins can then use board permissions to invite collaborators to upload, while still controlling publishing and sharing abilities. Admins can review boards and content sent to trash by users. This can give Admins the opportunity to avoid data loss. An example of an admin window showing permissions for different user levels can be seen in FIG. 13.

In some embodiments, board owners can automatically share content that is public to public media outlets, while a collaborating user can only share to public media outlets with a board owner's permission. Boards can only be shared to public media by a member of the ecosystem or public when boards are set to public. Content within boards that is not public can be hidden and not seen by public guests. Content (both Web-based and uploaded) that is public can be seen. Embodiments can be configured such that only public content that is web-based can be shared individually to social media but not uploaded non-private content. If a collaborator is permitted to share at the board level, email sharing can be made available for individual pieces of web content. Users with permission can comment, like, and share. This feature can track workflow, e.g., on collaborative boards. The system can act as a publishing platform, e.g., when board links are shared via social media or email. Guest users can be limited to only seeing collaboratively shared or public content. Both public and ecosystem users can be allowed to search by multiple variables. A user page can include a panel showing an activity feed. The feed can be controlled by neighborhood admins and/or comprised of elements including: announcements, created by neighborhood admins; neighborhood activity, which can be an automatic feed of published boards (ecosystem and/or public); and social media feeds, such as a Twitter feed, and can correspond to social media links given for the user's page profile.

Workflow

For both communication and FSS apps, one goal is greater efficiency in workflow and collaboration. But, while machine interoperability has been proffered as an adequate replacement of human interact-ability, collaboration has been limited by artificial constraints. When most people think of collaboration, they immediately think of projects and teams—and, while this is a good example, it has limited our way of thinking about human collaboration. Instead of focusing on how humans work together on projects (e.g. research, sharing of knowledge, providing input, harnessing human capital), current collaboration apps are only capturing files within projects, and relying on the ability of searching to locate them if and when they are needed at later time—similar to email. The end result is not a human curated knowledgebase that can be archived and leveraged, but rather loosely affiliated work product folders.

Embodiments can address these deficiencies by implementing a content-centric system. For example, all files and folders can be manipulated, monitored, and/or read for analytics, and interoperability via an API can be mapped. Accordingly, embodiments can foster customer growth. Analytics need not be a question of what can be read, but rather, what does one wish to know about—e.g. the behavior of users, departments, content, public interaction, etc.—because the content can record all transactions. The interoperability of APIs can include exporting files to social media sites and blogs and connecting to competing models (such as Dropbox and/or others). APIs can also facilitate more detailed integration, for example due to the content centric nature of the system.

File Sharing

When sharing files, an important security concern is how content is shared and accessed. Emphasis has been skewed toward system inter-operability between database and attendant applications rather than human interact-ability between users. In such systems, security of user data is balanced against the needs of systems to interoperate. As more applications are plugged into such systems, the integrity of database security is typically weakened.

Certain architectural principles—including role-based access permission and central login—have been considered best practices. Such premises, however, are based upon legacy file structure systems and need to be examined for their viability in modern systems such as in cloud-based systems. Examples of such principles bear examination or are no longer valid can include: a central OAuth-type system; the convenience versus security myth; and two-step verification in transferring files.

Normally, a central login, or OAuth type system, can allow users to sign-in to multiple apps with one user account, e.g. Facebook, and is often considered necessary for cloud computing. For security conscious organizations, however, such apps often violate information protocols as all access-based information pertaining to the user is typically stored on the application, including: username and password schemes; specific usernames and affiliated passwords; and file locations and authorizations. Cloud hosting is often implemented simply as a server someone else manages, which means that the security of the data is held by a third-party—even if hosted as a private instance—which connects all organizations through a centralized OAuth type system, containing the decryption keys to all stored data. Some embodiments overcome this problem by implementing a federated cloud knowledgebase, in which all access information can be held on the organizations private server/instance, i.e. not on a central app server. This type of decentralized system can require that user names be independently generated on disparate systems that can be used, but not decrypted, by a central server.

Another, often minimized, issue of file sharing that arises in the context of cloud computing is the convenience versus security myth. Most FSS models are secure only if roles within the organization are hierarchal and clearly delineated. Problems arise when nested files become complex flow charts of information, and secure sharing cannot be achieved within the system. When this happens, administrators are often tasked with reviewing all folders and documents linked by roles to collaboration requests, creating administrative bottlenecks and increasing transaction costs; creating multiple, task-specific folders and/or duplicating files within limited-sharing folders, resulting in new silos and destroying context; and/or sending documents outside the system in an unsecure manner (i.e. two-step verification). Regardless of which ad hoc solution is attempted, both aggregation style and file storage model cloud apps can break down when information begins to scale. For example, the two-step verification procedure is generally employed by all previous file sharing SaaS models. In this model, however, security is sacrificed for convenience. Most previous cloud-based business productivity apps mask serious security problems within terms of art, such as risk adjusted. Such protocols reveal inherent security flaws that are both a threat to IP and a hurdle to scalability.

Embodiments can include cloud-based collaboration and a content management platform where access permissions can be directly on the content. Both individual files and curated folders (i.e. boards) can hold their own permissions, independent of roles, which can be set by the user/owner, limited to user permissions set by the administration. Unlike forced hierarchal folder models, content-based permissions can give both users and organizations greater flexibility in creating practical work groups on-the-fly, while reducing administrative bottlenecks.

Traditionally, documents hosted in clouds have been accessible via URL and, as cloud apps developed, linking replaced sending as a means to share content. Sending a link is not secure. For example, links can be copied, redistributed, and/or stolen. Accordingly, most cloud apps have implemented a two-step verification procedure for private sharing. In most cases, this involves emailing an allegedly secure link on a separate channel (e.g. email), and either providing an access key (via another channel for security, e.g. text) or setting a time-out mechanism, or both. The myth of the two step verification lies not in the security of the double handshake itself, but rather in how it is executed. The two-step protocol typically tasks users with keeping track of multiple keys on other systems. But the fundamental nature of a system utilizing permissions sent externally over emails or texts or distributing exposed URLs cannot be considered a secure file transfer system. This also directly affects scalability. For example, on some previous systems, file hierarchy has required an adherence to a security protocol. Using keys to include additional viewers can create administrative problems that preclude meaningful stakeholder adoption.

Embodiments can be implemented as cloud-based collaboration and content management platforms that do not require external channels for secure collaboration. In such embodiments, access permissions can be granular and tied to the content so that ideas can stay together. Individual boards and files can be hidden from viewing when a user lacks access permission. Two-step authentication can be achieved seamlessly, and users need not keep track of files, keys, and/or links.

Embodiments can achieve secure IP and file transfer. Permitted users can create secure local and network folders that are synced for secure file transfer. Access permissions can be set and edited by the content owner. Workflow and/or dealflow can be managed by access permissions. Content can be organized and maintained as well as can be released all at once or as relationships or projects develop. Collaborative curations can provide a secure platform for privately communicating large amounts of contextualized content (e.g. reporting, research papers, documentation and media) in industry sponsorships, strategic alliances, and cross-institutional collaboration.

In contrast to the inter-operability model, which approaches user experience from a machine structured processes, the interact-ability model can utilize a human-centric user experience that is integral (i.e. baked-in) to the design. Embodiments can utilize a central login because the unique architecture of certain embodiments does not impose direct control on user information. All access and permission information can be stored on an organization's private server, whether virtual or hosted by the organization itself. User identities can be generated on the organization's private server/instance.

Accordingly, multiple databases can connect from hosted databases to those behind security firewalls and to those that require Lightweight Directory Access Protocol (LDAP) or other private identity schemes. Such architecture can be a key feature of a central server providing a secure, federated cloud knowledgebase. Unique user identities can be hidden from a central server using multiple, organizational-specific, random encryption techniques. If the first value proposition of the secure file transfer protocol is the unique PeerID system, the second can be content-based permissions.

Figure 12:
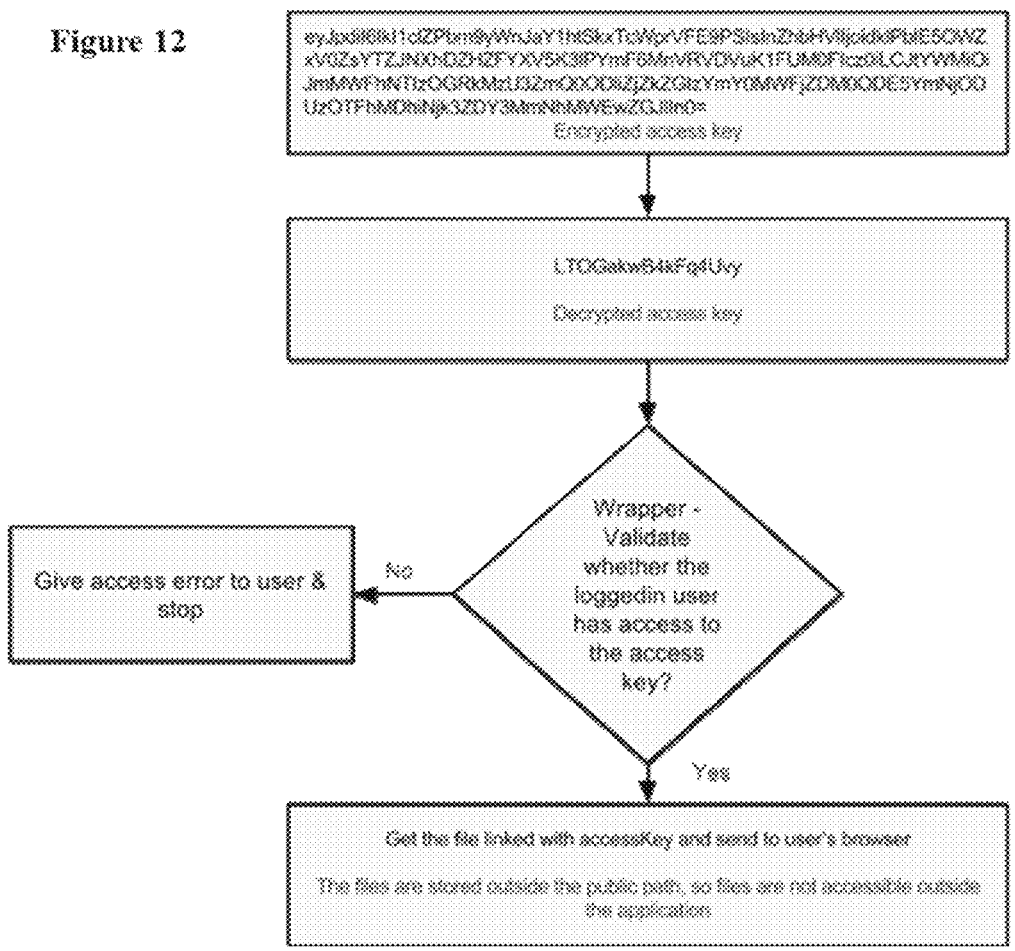
FIG. 12 an exemplary file sharing security flowchart.
Figure 1:
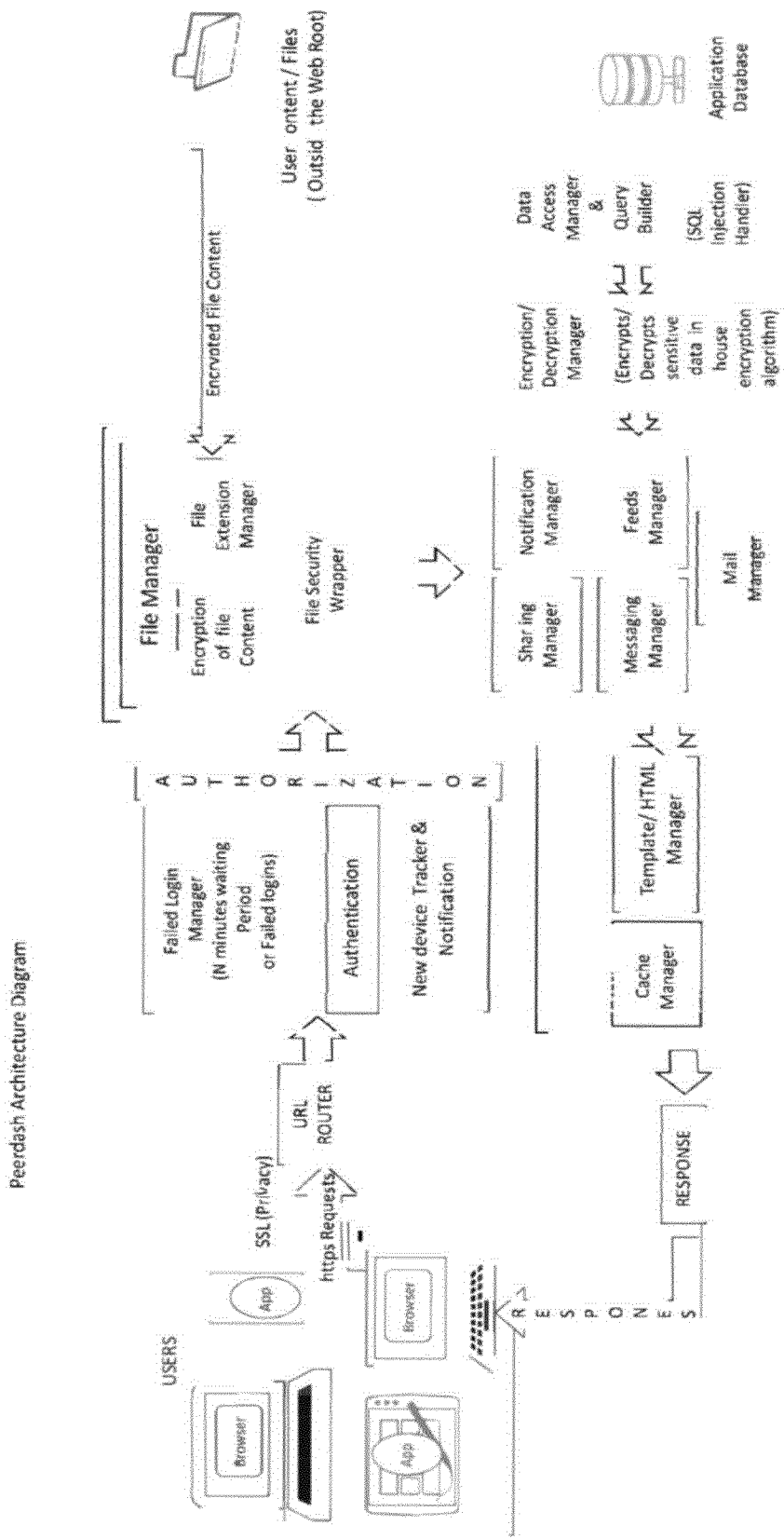
Figure 2:
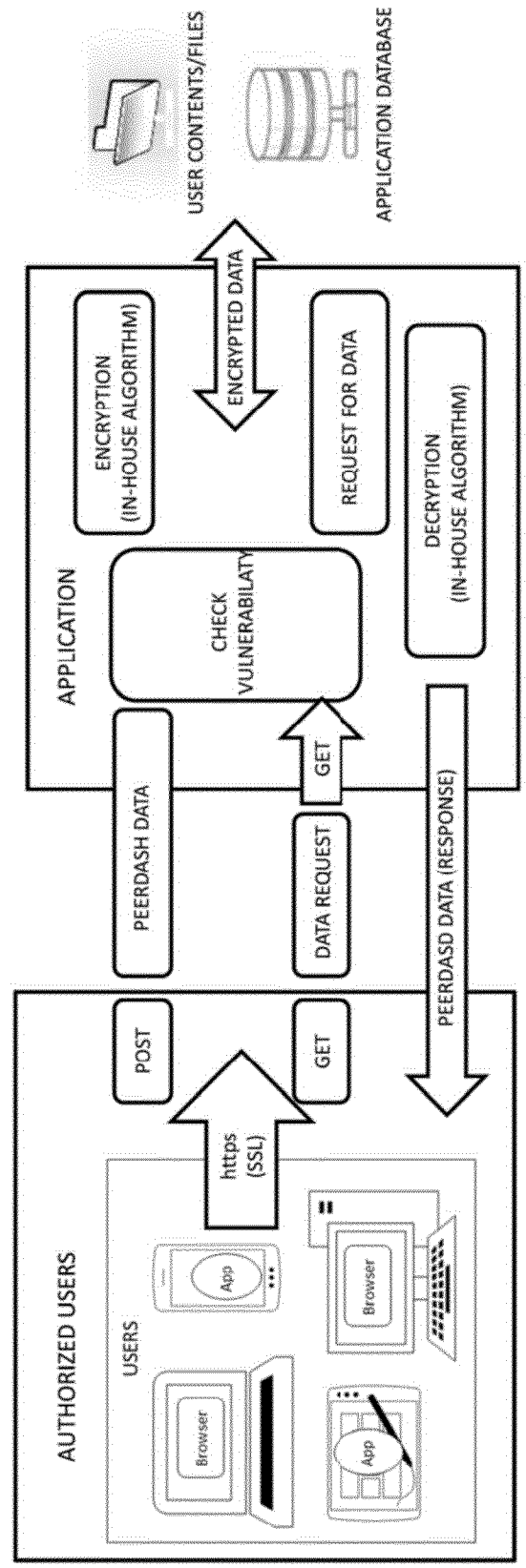
Figure 3:
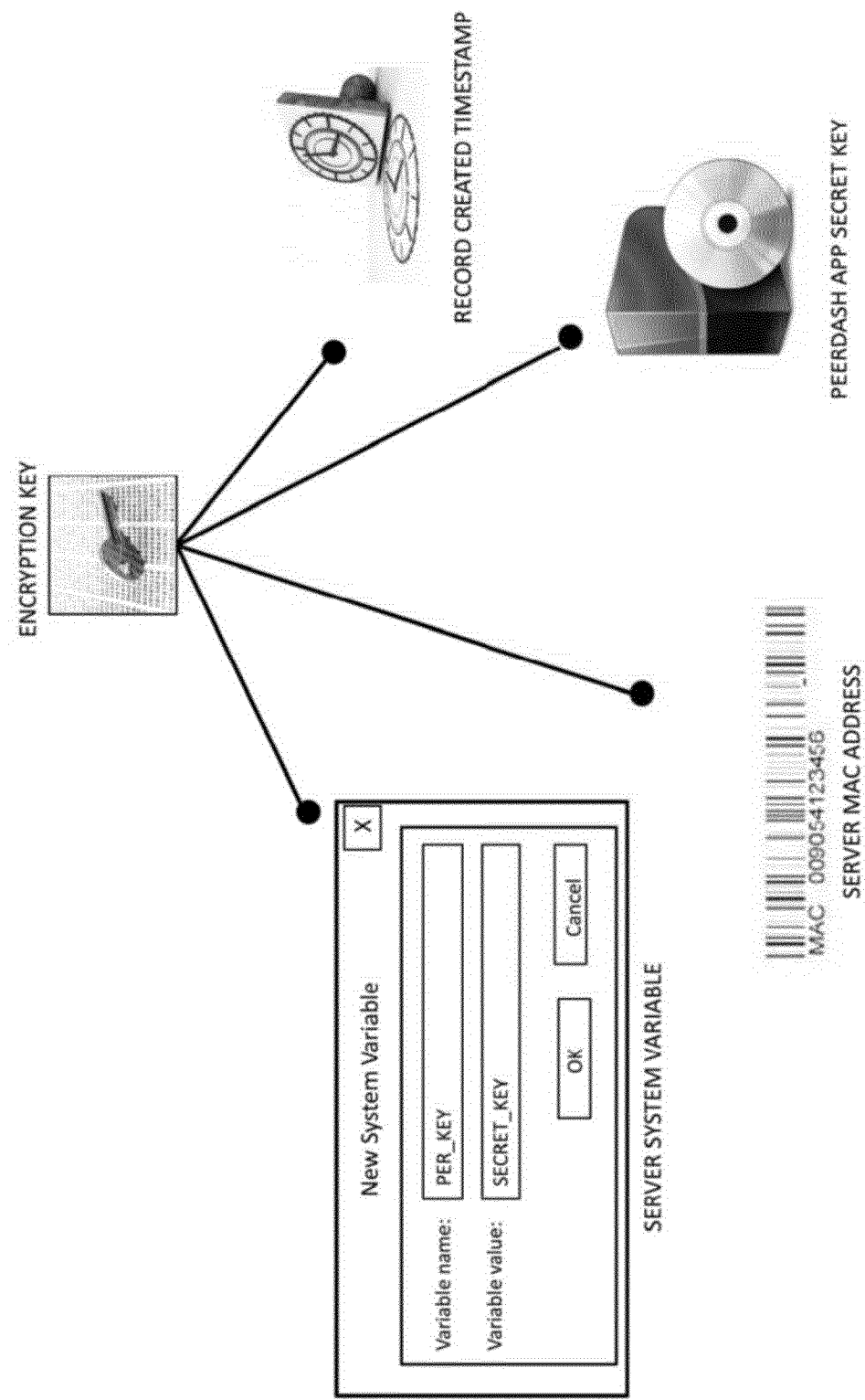

A file sharing security system can preferably include multiple levels of security. For example, files can be stored outside a public path, preventing direct access to such files, with the filename outside the application. In some embodiments, filenames are nowhere used in the application, but instead AccessKeys can be used, which can be random strings mapped to the filenames. Each AccessKey can be encrypted, e.g., using strong AES256 encryption via the mcrypt PHP extension before passed to other users. An exemplary file sharing security flowchart is shown in FIG. 12. As shown in the figure, if a user wishes to share content (e.g. a file) by sharing a URL, several security steps can be taken. If the system cannot validate whether the logged in user has access to an access key, the system can generate an error and/or prevent access.

If a user saves any critical or confidential files in the system, the file content can also be encrypted using strong AES256 encryption, e.g., via a mcrypt PHP extension with a dynamic key before storing into server. Accordingly, the system can be configured to prevent access even by system admin or other higher level users. When a user selects to encrypt content during or after uploading, a random key can be generated and stored with respect to the content. The content can be encrypted with the random key before storing in server. The system can also be configured to generate an error stating that a file in the server is corrupt if an unauthorized user attempts to open the file in the server. A random/dynamic key can be stored in the secure database, and so a periodic backup of database may be required.

Communications

Previous business apps generally fall into two classes: social business tools and file sync and share (FSS) tools. Social media tools generally focus on written communications, and content, whether hosted or linked, is typically ancillary. Conversely, FSS systems are designed for content sharing with limited human interaction beyond direct document collaboration. A problem with these two approaches is that reconciling the two often requires the interoperability of multiple apps. Such additional levels of aggregation (content and communications) usually require multiple licensing agreements, increases security risks, and invests the organization in a suite of products that will soon become redundant as software moves to the cloud. Embodiments can focus on the interact-ability of the users, rather than the interoperability of third-party feature apps, and can include a full spectrum of communications and content level sharing with the added value of anticipating organizational needs by allowing creation of a user-generated knowledgebase with minimal oversight that can be leveraged internally to publicly.

Figure 7:
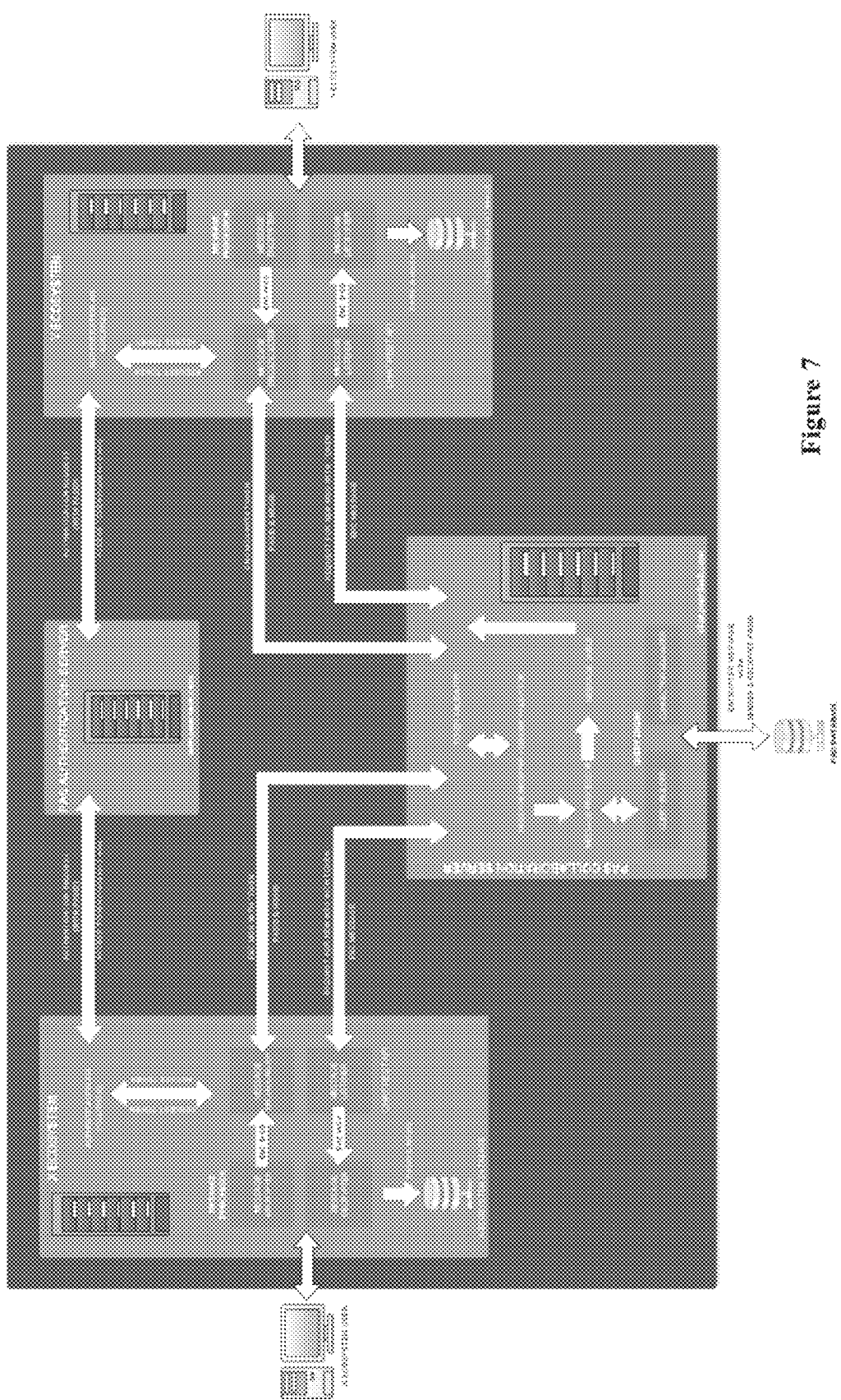
FIG. 7 illustrates an exemplary embodiment implementing ecosystem-to-ecosystem chat and messaging.
Figure 8:
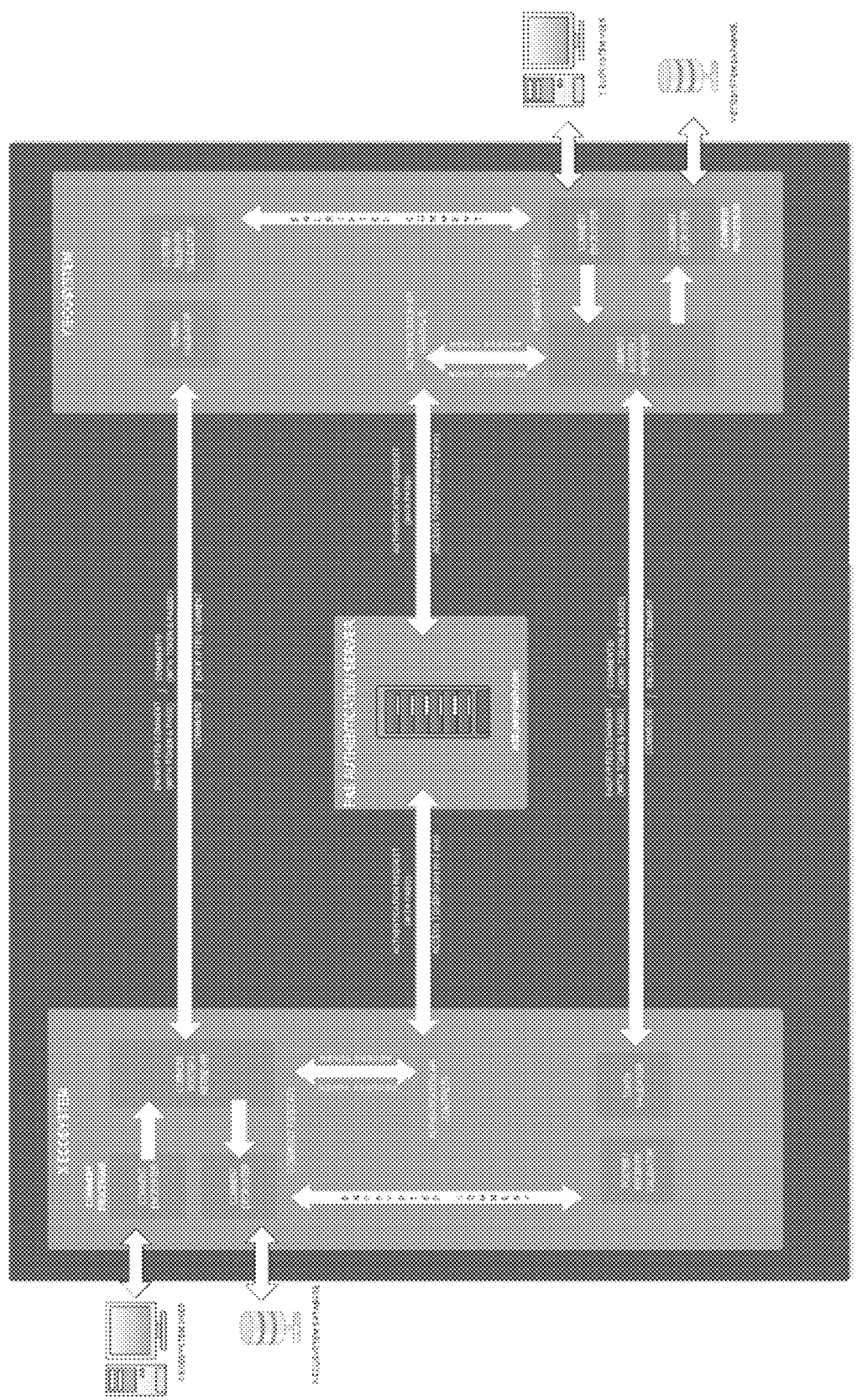
FIG. 8 illustrates an exemplary embodiment of ecosystem-to-ecosystem commenting on content.

Embodiments can include instant messaging (IM) to allow centralized, real-time communications between institutional users and/or authorized, outside collaborators. FIG. 7 illustrates an exemplary embodiment during ecosystem-to-ecosystem chat/messaging. Automatic curation/project updating can keep subscribers/collaborators informed and up-to-date, and automatic alert notifications can be sent upon the addition of curations and/or changes to projects. Collaborative curations or collaboration project requests can be handled by authorized users, and need not require administration, increasing workflow productivity. FIG. 8 illustrates an exemplary embodiment ecosystem-to-ecosystem commenting on content.

An effective knowledgebase can include an ability to manage content. Previous FSS and communications apps generally fail to anticipate the full lifecycle of content management. Present embodiments can implement an effective knowledgebase with increased manageability by facilitating efficient content discovery. Users can subscribe and/or follow, post to social media, and/or use the platform itself for publishing pages with real-time feeds, SEO, and robust search capabilities. Whether the data is shared between a small group of people, throughout the organization, or publicly, the platform can keep ideas contextualized while granular level content permissions can decide who can view, edit, and/or comment. A centralized UX can allow organizations to create searchable, branded platforms that can be publicly accessed. Security features inherent to the architecture allow organizations to invite participation without risking data leaks.

Users authorized by an organization can create a digital library of research, organizations, and people that can be discovered and followed or leveraged by stakeholders of the organization. As a user-created knowledgebase, users can be tasked with categorizing and/or describing (e.g. editing metadata of) content added to the CMS. Projects and curations can be published on or by the CMS. Published content can be attributed to its owner, further contextualizing people with ideas that can be followed by potential stakeholders. These can ensure that ideas and/or contextualized data can be discovered through searching. Connections can develop into long-term economically beneficial relationships. Subscribed content can provide the most up-to-date information, fostering sponsorships, and industry cooperation. Collaboration tools can go beyond sharing to foster social media-like exchange and development of ideas. Privacy settings can allow for the secure transfer of IP to select individuals. As a central platform with decentralized tasking, published content can become a media rich library for individuals and/or organizations to socially engage and amplify an organization's messaging. Further, present technology can reduce engagement costs, maximize institutional HR, and/or amplify human capital, fostering cross-discipline to interinstitutional collaboration.

Figure 9:
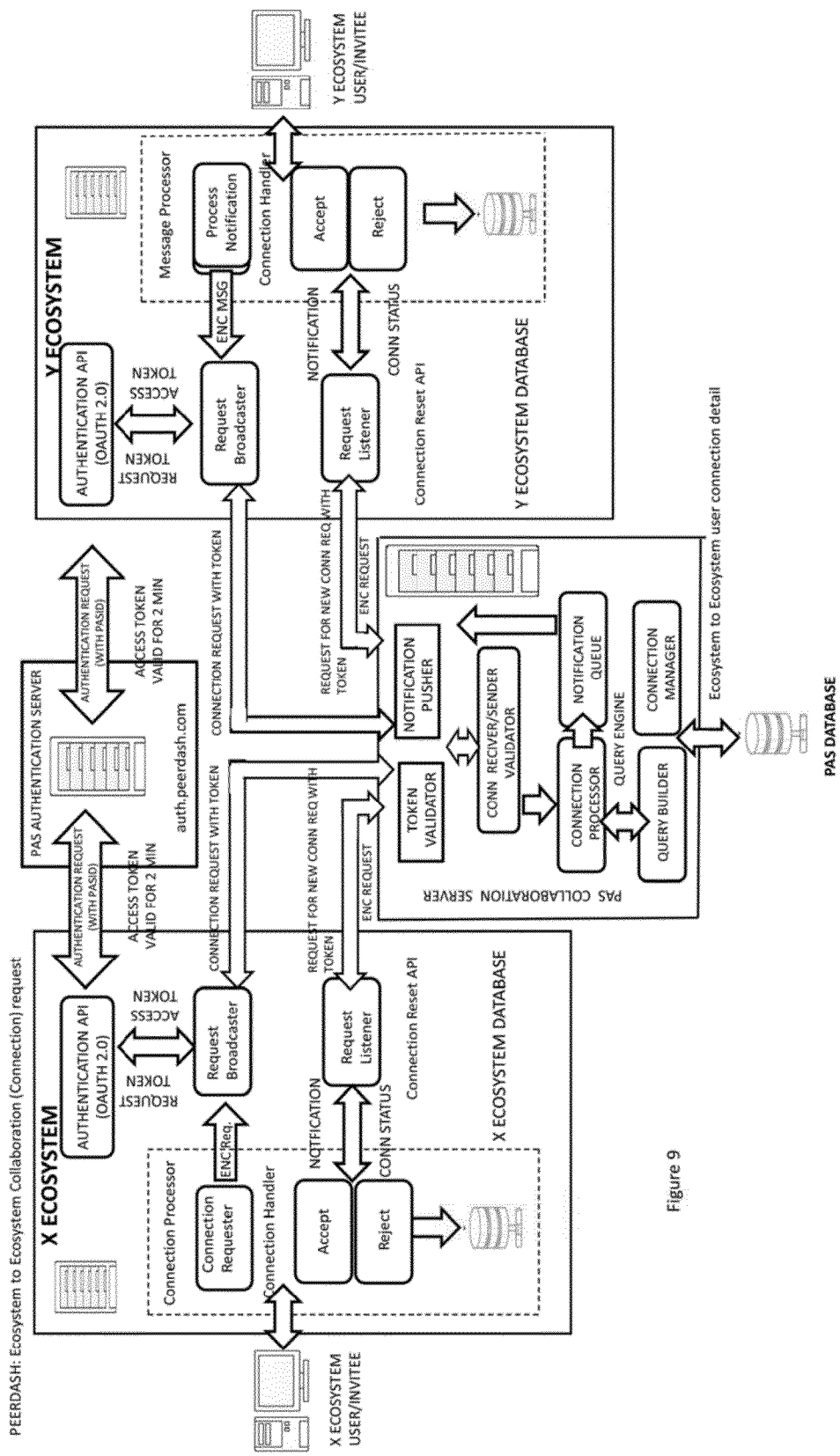
FIG. 9 illustrates an embodiment for ecosystem-to-ecosystem collaboration/connection requests.
Figure 10:
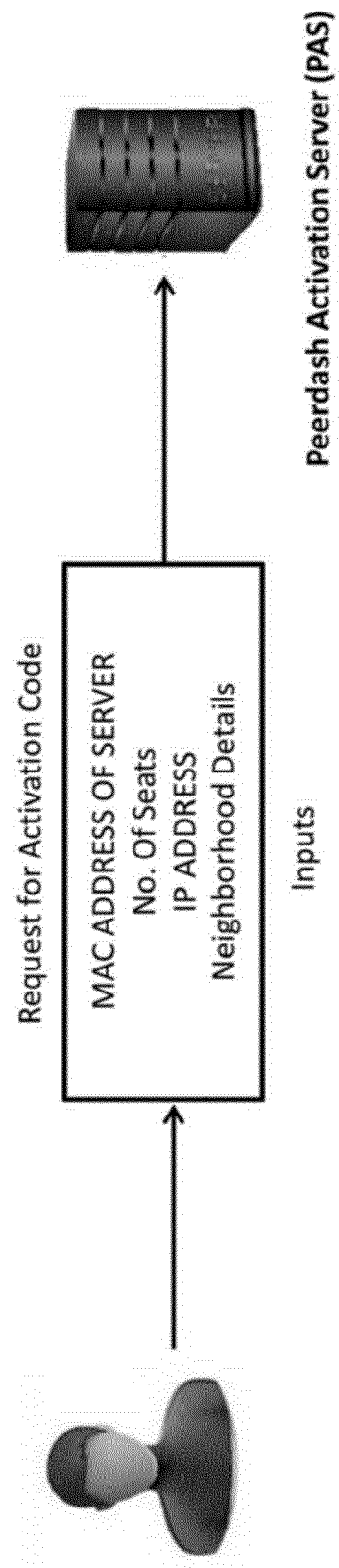
Figure 11:
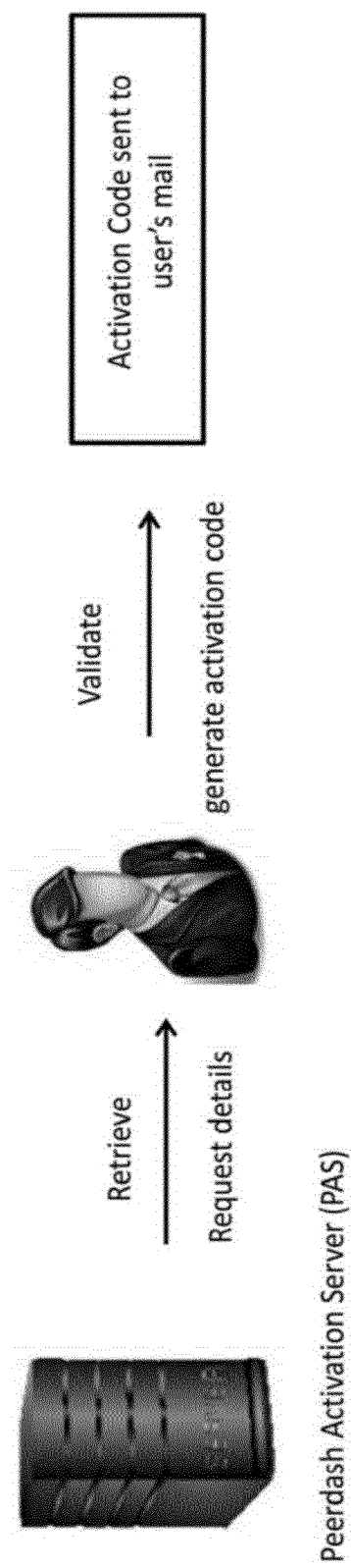
Figure 12:
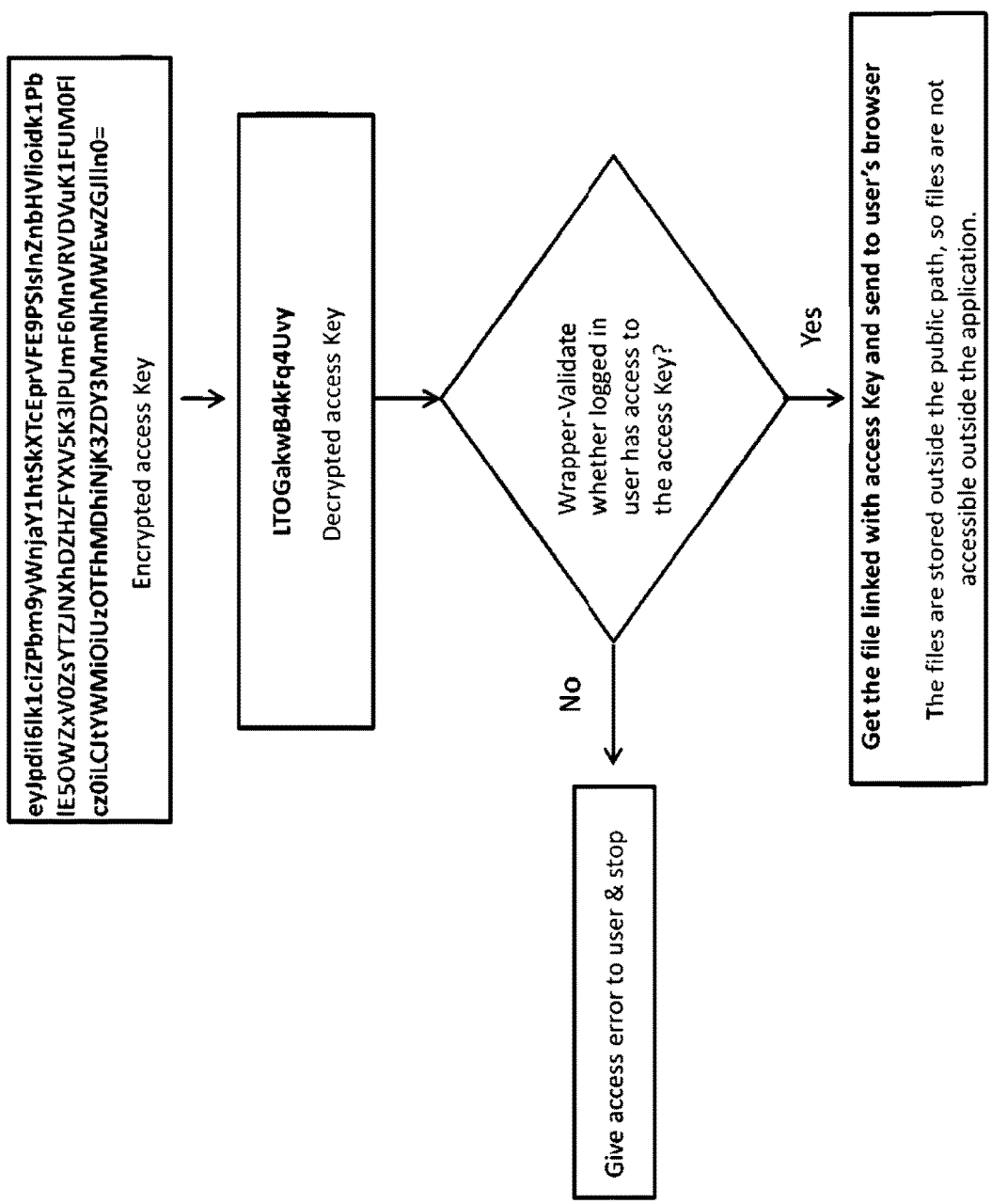

Embodiments can be customized to serve an organization's mission. FIG. 9 illustrates an embodiment that includes ecosystem-to-ecosystem collaboration/connection requests. Private collaboration and knowledge transfer can foster cross-institutional research, resource sharing, and commercialization by-and-between individuals, groups, organizations, partnerships, and/or institutions. Embodiments can be searchable for media-rich knowledgebase of resources, and messaging can be amplified, including recruitment, news, and/or initiatives.

Project access permissions can allow sharing to a limited number of contacts, inter- to cross-institutionally, or even publicly. This can be used as a means to educate and/or inform. Embodiments can autonomously build timelines of collaboration projects and/or allow users to generate timelines. The platform can allow invited users from within or outside the organization to comment and upload files to group projects, creating, e.g., a record of business decisions. Authorized users can create informative and/or training presentations with drag-and-drop functionality. Presentations can be shared within groups for collaboration or published globally, e.g., for SEO purposes.

User pages can include institution branding. Administrative controls can decide the publishing rights of individual users or groups of users. In some embodiments, all private content can only be shared public media outlets by the owner of the content (provided user is allowed). In some embodiments, public content can be shared by any user and/or the public at large, amplifying social media efforts. A user's public content can be optimized for SEO by the user, increasing searchability of content. Content can be subscribed to—and leveraged for social media—by an organization on its public page, reducing marketing/administrative workload.

Large media files and documents can be uploaded into marketing and sales repositories. Content can be updated for up-to-date, easily accessible materials. Organizations can leverage the organized, contextualized information, and the knowledgebase, to create press kits, recruitment pages, newsletters, etc. A searchable secure database can also allow quick reactions and responses to current events, with existing or automatically updated content, aggregated by users or stakeholders.

The knowledgebase and content management system can increase cooperation, foster collaboration, by and between organizations and people. Multi-level and/or multi-institutional involvement can be achieved with a centralized repository that can be accessed by many stakeholders, in many institutions. Additional collaboration and publishing tools can also be included, as well as security designed for storing and/or transferring IP files. Many organizations, however, can be challenged by resource and administrative shortages. Present embodiments can effectively marshal cross-institutional resources by, e.g., including democratic, or decentralized, functionality. For example, embodiments can include a privately installed, branded platform for ecosystem management, interinstitutional collaboration, and/or amplification of stakeholder collaboration. The embodiment can include a centralized knowledgebase, CMS, secure access permissions, and/or social technology for intra- to inter-organizational knowledge transfer, file management, and/or social publishing.

Whereas prior inter-enterprise technologies can limit participation and put stresses on administrative workload, present embodiments can allow users to curate (e.g. collect and organize files, media and web pages) complex ideas, such as research or due diligence and/or to create collaborative projects with social work-flow that can provide a clear record of decision-making for group projects, research, and teams within or across multiple organizations. Present embodiments can be implemented to enhance security and IP protections. For example, systems can be installed on an organization's servers, negating external vendor security concerns. Access permissions can reside on the content level, and access to files through independent URLs can be prevented. In a preferred embodiment, all user files, curations, slides, and projects can be private by default, but also can be shared selectively, collaboratively, and/or publicly as desired by users and/or administrators. Selective sharing can include secure knowledge/IP transfer via platform controls utilizing granular-level IP protection. As an example, authorized users can create their own synchronized file storage space (e.g. a Dropbox-like folder) for secure file transfer and individual and/or group review. Collaborative sharing can include secure platforms for privately communicating among a group or organization large amounts of contextualized content, such as reporting, research, documentation and/or media for industry sponsorship, strategic alliances, and/or cross-institutional collaboration. Public sharing can utilize social media and/or publishing as a resource to an organization's branded platform, which can be leveraged by and for institutional use, such as industry sponsorships, strategic alliances, cross-discipline research, program recruitment, and/or media-rich learning.

Some embodiments can be implemented as single platforms for workflow and communications. Such platforms can reduce transaction costs associated with multiple legacy technologies and administrative workload. Administrators can set user-permissions and create a secure environment for users to virtually collaborate without admin or IT assistance. This can foster cross-institutional research, commercialization, and multi-institutional projects. The platform can include a crowd-sourced database to further reduce costs associated with developing and maintaining a digital library of stakeholders, research, and institutional resources.

The platform can amplify a group's messaging by, e.g., aggregating its combined resources. The decentralization of tasking and responsibilities can provide transparent workflow for simplified administrative oversight and peer or team review of research, proposals, due-diligence, documentation, and/or ongoing reporting. Secure file transfer coupled with database technology can negate expensive legacy products and external vendors, and can be adapted for marketing solutions or ad hoc product suites, which otherwise could violate IP transfer security protocols.

Embodiments can include multiple channels, built in search engine optimization (SEO), media capabilities, and/or visual Web 2.0. These can improve engagement through search ranking, content tagging, and/or intuitive discovery interfaces. For example, stakeholders, users, researchers, etc. of an institution can build digital career portfolios with CVs, social links, media, digital files, and/or web links. Profiles can also be searchable by various criteria, such as organization, skills, and/or areas of interest, facilitating stakeholders' connections through the platform or via links to profiles on Facebook, LinkedIn, Twitter, or other social media. Potential financial stakeholders or other interested parties can search all published public content as well as non-public content that such persons have permission to view. The platform can also allow following of an individual or body of work. Users can also have a multi-media platform to respond to current events or public questions in a comprehensive, contextualized format. Data feeds from media outlets, such as government sites, can be served via an API. Such feeds can be viewed and/or followed through the platform.

Embodiments can reduce administrative bottlenecks and decentralize workloads. Moreover, they can be implemented with user-friendly and/or intuitive graphical user interfaces (GUI) such that social tools need not require technical expertise, increasing stakeholder participation. Through permissions granted by an administrator, authorized users can manage their own content and/or projects, invite collaborators, make connections, network, and/or amplify messaging. A directory can be utilized, which can allow public users to locate other users, such as researchers or start-up entrepreneurs, in order to connect with them and/or follow their work. Organizations can leverage published stakeholder content for, e.g., marketing, education, and/or increased access to resources.

Embodiments can include various core features, such as administrative controls, decentralized functionality, curation, social business tools, access & sharing, metadata & SEO, and/or search & follow. Administrators can control page branding, user permissions (e.g. editor approval before publishing), and/or public organizational/departmental pages. Each authorized user can maintain his or her user account. User account limits (e.g. for sharing and/or collaboration), properties, and functionality can be set by administrators. A user can upload files and collect content into curations, i.e. multi-source, multi-media folders, which can be linked to the user's profile. Users can also create slide presentations, connect through chat or organizational email, and/or create virtual work spaces for multiple, decentralized collaborators. In a preferred embodiment, all content can be saved as private, and users and/or administrators can permit selective access (e.g. for file transfer and/or collaboration) or publish, such as to a social medium. Metadata can be edited by the content owner or uploader, such as by means of clickable buttons on a GUI, and can be optimized for searching. Users can publish curations for potential stakeholders or other interested parties to search and/or follow.

Embodiments can also include various customizations, such as to enhance security, searching, publishing, and/or analytics. For example, embodiments can incorporate one or more of the security protocols described herein and/or as are known in the art. Customization can further include user interfaces having customized search fields, categories, and/or content mapping.

Figure 10:
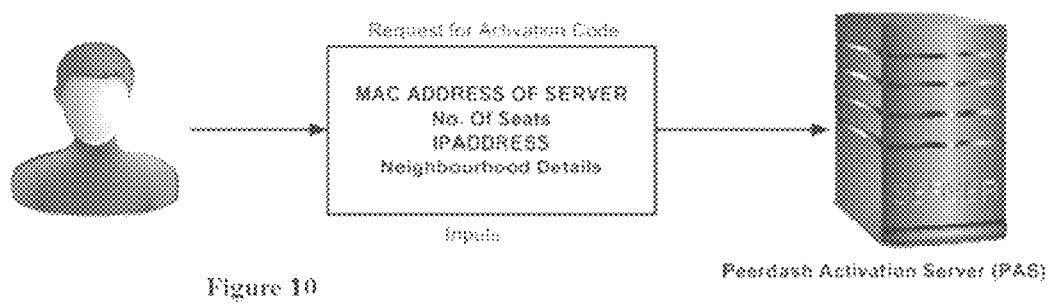
FIG. 10 depicts exemplary activation process and neighborhood identification.
Figure 11:
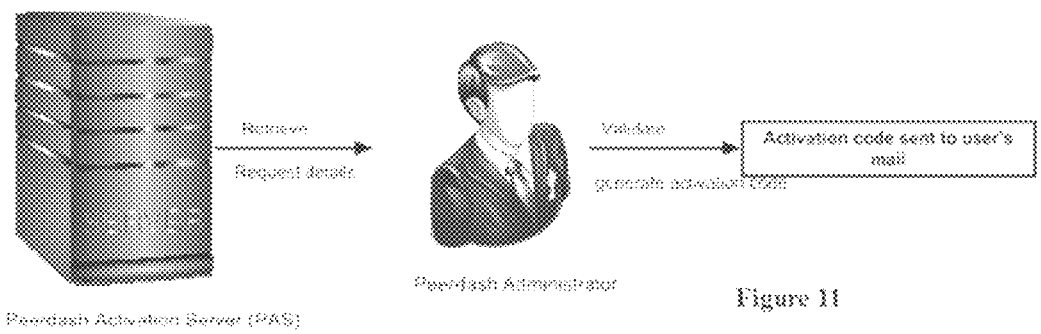
FIG. 11 depicts exemplary activation process and neighborhood identification.

FIGS. 10 and 11 depict aspects of exemplary activation process and neighborhood identification. In a first step, shown in FIG. 10, a system admin request can be made for an activation code by filling in a form from a proprietary website and/or an intranet location. Form inputs can include a unique identifier, such as a media access control address (MAC address), the number of seats, an IP address, and neighborhood details. In a second step, as shown in FIG. 11, an admin can validate the input given by a user and generate an activation code. The activation code can be a unique, random string. After installing the application, the system admin can feed the activation code and activate the application. A PAS can validate the MAC address of the system where the application is installed and the number of seats. In a third step, a neighborhood ID can be generated. Once the activation code is activated successfully, a neighborhood ID will be generated by the PAS and sent to the application. The neighborhood ID can be a unique random alpha numeric string (e.g. 16 char). Each neighborhood ID can be mapped by MAC address, number of seats, IP address, and/or activated timestamp. The MAC address can be encrypted and stored as encrypted text or as a hash value on the database. The system can also utilize PeerID, which can be a unique random alpha numeric string (e.g. 16 char). Each PeerID can be mapped by neighborhood ID, IP address, PeerID generated timestamp, and/or browser details such as browser name, user agent, HTTP_ACCEPT header, browser plugin details, time zone, screen size and color depth, system fonts, and/or cookies. Brower and system details can be stored by PeerID, for example, to validate whether a user uses the same system for each instance.

Other embodiments are within the scope of the following claims.

The invention claimed is:

1. A secure network ecosystem, comprising; a URL programming interface;
   a server computer configured to receive at least one request from the URL programming interface, wherein the at least one request is at least one of performing a search, uploading metadata, and collaborating,
   wherein the server computer includes:
      a file manager,
      an authentication server that ensures the at least one request is valid via the reference of a non-standard usage of an OAuth authentication API that uses a time limited token generated from the authentication server, wherein when the at least one request is validated by the authentication server, a user is granted selective access to the file manager as specifically defined by users and administrators,
      a resource server that receives public metadata updates from across the ecosystem for indexing and/or ranking and returns relevant search results to search requests, and
      a collaboration server that manages collaboration requests or notifications between users of different ecosystems; and
   a secure database connected to the server, and all access and permission information is stored on each ecosystem's private server.

2. The system of claim 1, wherein the authentication server ensures that the at least one request is valid.

3. The system of claim 1, further comprising an application program interface configured to authenticate the time limited token generated by the authentication server.

4. The system of claim 3, wherein the time limited token has a lifetime of less than five minutes.

5. The system of claim 4, wherein the time limited token has a lifetime of less than two minutes.

6. The system of claim 3, wherein the at least one request is an HTTP communication.

7. The system of claim 3, wherein the at least one request is an FTP communication.

8. The system of claim 1, further comprising a second secure network ecosystem, wherein the second secure network ecosystem comprises:
   a second URL programming interface; a second server; and
   a second secure database connected to the second server,
   wherein the second secure network ecosystem is configured to receive the at least one request and an authentication request from the secure network ecosystem.

9. The system of claim 8, wherein the second server determines whether the at least one request is authorized based on the time limited token generated by the authentication server.

10. The system of claim 1, wherein the resource server includes a central repository of metadata.

11. The system of claim 10, wherein the metadata is publicly available.

12. The system of claim 11, wherein the metadata is associated with content, and wherein the content is not publicly available.

13. The system of claim 12, wherein filenames associated with the content is not publicly visible.

14. The system of claim 11, wherein the metadata is publicly searchable.

15. The system of claim 10, wherein the resource server includes a token validator, a query engine, and a metadata manager.

16. The system of claim 1, wherein data is stored on the secure database in a first normal form (1NF).

17. The system of claim 16, wherein the data violates a third normal form (3NF).

18. The system of claim 1, wherein the secure database is at least partially non-normalized.

19. The system of claim 18, wherein the secure database contains content, and wherein filenames associated with the content are encrypted.

20. The system of claim 19, wherein extensions associated with the content are encrypted.

21. The system of claim 20, wherein the secure database further contains public content that is stored as plaintext.

22. The system of claim 1, wherein data on the secure database have locations.

23. The system of claim 22, wherein the locations are obfuscated.

24. The system of claim 22, wherein the locations are stored outside of the secure database.

25. The system of claim 22, wherein the locations are hashed.

* * * * *

UNITED STATES PATENT AND TRADEMARK OFFICE
CERTIFICATE OF CORRECTION

PATENT NO. : 9,847,994 B1  
APPLICATION NO. : 14/871920  
DATED : December 19, 2017  
INVENTOR(S) : Kelly et al.

Page 1 of 17

It is certified that error appears in the above-identified patent and that said Letters Patent is hereby corrected as shown below:

On the Title Page

Delete the title page and Substitute therefore with the attached title page consisting of the corrected illustrative figures.

In the Drawings

Please replace Drawing sheets 1-15 with Drawing sheets 1-15 as shown on the attached pages.

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)

(12) United States Patent
Kelly et al.

(10) Patent No.: US 9,847,994 B1
(45) Date of Patent: Dec. 19, 2017

(54) SYSTEM AND METHOD FOR PROVIDING A SECURE NETWORK

(71) Applicant: SurfDash, Las Vegas, NV (US)

(72) Inventors: Jennifer Kelly, Santa Cruz, CA (US);
Robert Carr, Santa Cruz, CA (US);
Raymond Kelly, Santa Cruz, CA (US);
Seyed Safakish, Santa Cruz, CA (US)

(73) Assignee: SURFDASH, Las Vegas, NV (US)

( * ) Notice: Subject to any disclaimer, the term of this patent is extended or adjusted under 35 U.S.C. 154(b) by 245 days.

(21) Appl. No.: 14/871,920

(22) Filed: Sep. 30, 2015

(51) Int. Cl.
*H04L 29/06* (2006.01)
*G06F 21/62* (2013.01)
*H04L 29/08* (2006.01)

(52) U.S. Cl.
CPC ............ *H04L 63/083* (2013.01); *G06F 21/62* (2013.01); *H04L 67/02* (2013.01); *H04L 67/06* (2013.01)

(58) Field of Classification Search
CPC ........... G06Q 30/0251; G06Q 30/0269; G06Q 50/01; G06Q 50/184; G06Q 10/101; H04L 51/046; H04L 51/14; H04L 51/32; H04L 67/104; H04L 67/22; H04L 67/24; H04L 67/306; H04L 67/02; H04L 65/403; G06F 17/30867
USPC .................................................. 726/9
See application file for complete search history.

(56) References Cited

U.S. PATENT DOCUMENTS

| | | | | |
|---|---|---|---|---|
| 2013/0018960 A1* | 1/2013 | Knysz | ................ | G06Q 50/01 709/204 |
| 2014/0067702 A1* | 3/2014 | Rathod | ................ | G06Q 10/10 705/319 |
| 2016/0006743 A1* | 1/2016 | Liu | ................ | H04L 9/32 726/4 |

\* cited by examiner

*Primary Examiner* — Brian F Shaw
(74) *Attorney, Agent, or Firm* — Steptoe & Johnson LLP

(57) ABSTRACT

A method and system for providing a secure network. The system can have a URL programming interface, a server, and a database connected to the server. The server can be configured to receive requests from the URL programming interface. The server can include a file manager, an authentication server, a resource server, and a collaboration server.

25 Claims, 15 Drawing Sheets

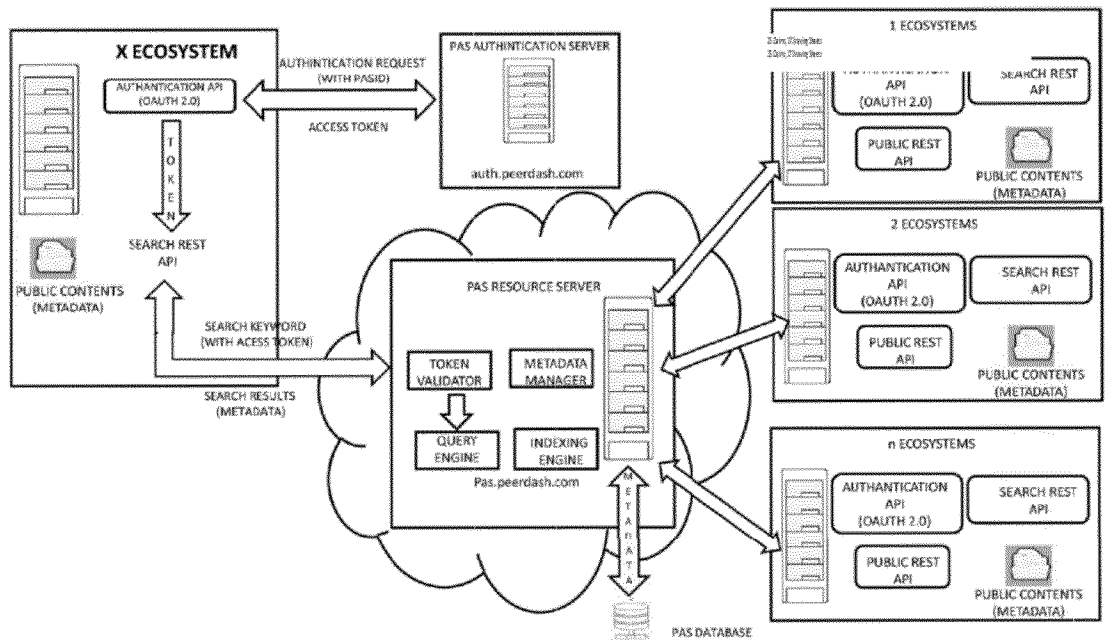

PEERDASH: DATAFLOW DIAGRAM

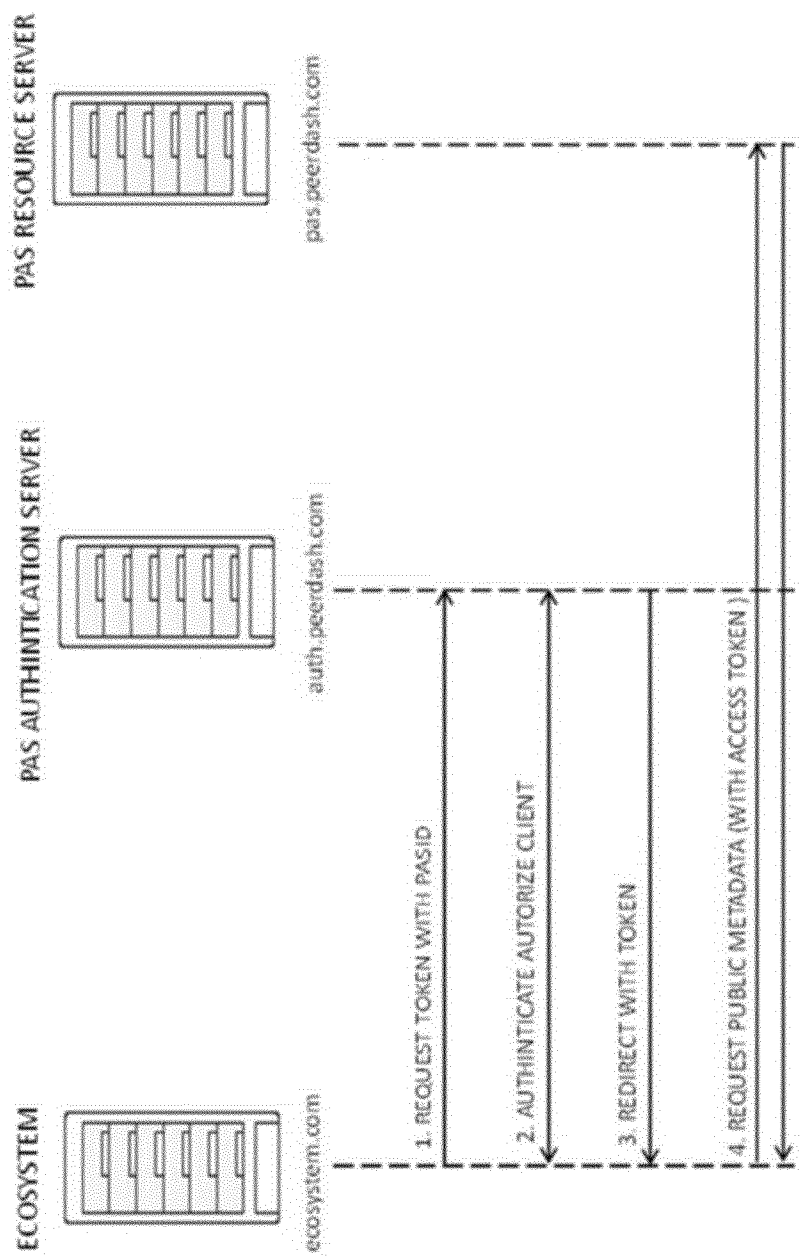

| EMAILING CONTROLS | Board Owner | Collaborators | Ecosystem Users | Public |
|---|---|---|---|---|
| EMAILING CONTENT | | | | |
| Email Web Content (not uploaded) | Y | Y | Y | X |
| Email Uploaded Content | Y | X | X | X |
| EMAILING BOARDS | | | | |
| Email Private Board | X | n/a | n/a | n/a |
| Email Collaborative Board | X | X | n/a | n/a |
| Email Ecosystem Board | X | n/a | X | n/a |
| Email Public Board | Y | n/a | Y | Y |
| SOCIAL SHARING OF CONTENT | | | | |
| Share Web Content (not uploaded) on Social Media Sites | Y | Y | Y | X |
| Share Uploaded Content on Social Media Sites | X | X | X | X |
| SOCIAL SHARING OF BOARDS | | | | |
| Share Private Board on Social Media Sites | X | n/a | n/a | n/a |
| Share Collaborative Board on Social Media Sites | X | X | n/a | n/a |
| Share Ecosystem Board on Social Media Sites | X | n/a | X | n/a |
| Share Public Board on Social Media Sites | Y | n/a | Y | Y |
| KEY | | | | |
| Y=Yes, if (board/content) permissions allow | | | | |
| n/a = not applicable, due to permission settings | | | | |

Figure 13